(12) United States Patent
Chen et al.

(10) Patent No.: US 12,348,262 B2
(45) Date of Patent: *Jul. 1, 2025

(54) FULL-DUPLEX SELF-INTERFERENCE CANCELLATION METHOD AND APPARATUS

(71) Applicant: HUAWEI TECHNOLOGIES CO., LTD., Shenzhen (CN)

(72) Inventors: Teyan Chen, Kista (SE); Ju Cao, Shenzhen (CN); Tao Wu, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/424,444

(22) Filed: Jan. 26, 2024

(65) Prior Publication Data

US 2024/0171211 A1 May 23, 2024

Related U.S. Application Data

(63) Continuation of application No. 17/509,984, filed on Oct. 25, 2021, now Pat. No. 11,923,888, which is a (Continued)

(30) Foreign Application Priority Data

Apr. 25, 2019 (CN) .......................... 201910339763.1

(51) Int. Cl.
 *H04B 7/00* (2006.01)
 *H04B 1/525* (2015.01)
 *H04L 5/14* (2006.01)

(52) U.S. Cl.
 CPC .............. *H04B 1/525* (2013.01); *H04L 5/14* (2013.01)

(58) Field of Classification Search
 CPC ............ H04B 1/525; H04L 5/14; Y02D 30/70
 (Continued)

(56) References Cited

U.S. PATENT DOCUMENTS

2013/0301487 A1 11/2013 Khandani
2014/0219139 A1* 8/2014 Choi ...................... H04L 5/1461
 370/278

(Continued)

FOREIGN PATENT DOCUMENTS

CN 102404039 A 4/2012
CN 104852752 A 8/2015
(Continued)

OTHER PUBLICATIONS

U.S. Appl. No. 17/509,984, filed Oct. 25, 2021.

*Primary Examiner* — Chuong T Ho
(74) *Attorney, Agent, or Firm* — Leydig, Voit & Mayer, Ltd.

(57) ABSTRACT

Embodiments of this application disclose a full-duplex self-interference cancellation method and apparatus. The full-duplex self-interference cancellation method may be applied to the field of radio frequency self-interference cancellation in a full-duplex scenario. The full-duplex self-interference cancellation method is implemented by a full-duplex self-interference cancellation apparatus with self-interference reconstruction modules of two levels, and the full-duplex self-interference cancellation apparatus is implemented by a terminal. This greatly reduces hardware implementation complexity and costs of the second self-interference reconstruction module, and improves a full-duplex self-interference cancellation capability.

11 Claims, 15 Drawing Sheets

Related U.S. Application Data continuation of application No. PCT/CN2020/077190, filed on Feb. 28, 2020.

(58) Field of Classification Search
USPC .......................................................... 370/277
See application file for complete search history.

(56) References Cited

U.S. PATENT DOCUMENTS

| | | |
|---|---|---|
| 2016/0211927 A1* | 7/2016 | Mo ........................ H04B 15/00 |
| 2016/0285486 A1 | 9/2016 | Qin et al. |
| 2016/0295596 A1 | 10/2016 | Masmoudi et al. |
| 2016/0329982 A1 | 11/2016 | Lim et al. |
| 2017/0104506 A1* | 4/2017 | Liu ......................... H04B 1/109 |
| 2017/0111155 A1 | 4/2017 | Liu et al. |
| 2017/0163404 A1 | 6/2017 | Liu et al. |
| 2018/0026775 A1 | 1/2018 | Chen et al. |
| 2018/0063745 A1* | 3/2018 | Jain ................... H04L 25/03006 |
| 2019/0222296 A1* | 7/2019 | Khandani .............. H04B 7/086 |

FOREIGN PATENT DOCUMENTS

| | | |
|---|---|---|
| CN | 104935540 A | 9/2015 |
| CN | 105229981 A | 1/2016 |
| CN | 106253939 A | 12/2016 |
| CN | 106464284 A | 2/2017 |
| CN | 106712781 A | 5/2017 |
| CN | 107547105 A | 1/2018 |
| CN | 107580758 A | 1/2018 |
| WO | 2016178551 A1 | 11/2016 |

\* cited by examiner

FULL-DUPLEX SELF-INTERFERENCE CANCELLATION METHOD AND APPARATUS

CROSS-REFERENCE TO RELATED APPLICATIONS

This application is a continuation of U.S. patent application Ser. No. 17/509,984, filed on Oct. 25, 2021, which is a continuation of International Application No. PCT/CN2020/077190, filed on Feb. 28, 2020, which claims priority to Chinese Patent Application No. 201910339763.1, filed on Apr. 25, 2019. All of the afore-mentioned patent applications are hereby incorporated by reference in their entireties.

TECHNICAL FIELD

This application relates to the field of communications technologies, and in particular, to a full-duplex self-interference cancellation method and apparatus.

BACKGROUND

A wireless communications system may include a plurality of systems: a mobile cellular communications system, a wireless local area network (, WLAN) system, and a fixed wireless access (FWA) system. The wireless communications system may include various types of communications nodes. For example, the communications node may be at least one of the following: a base station (BS), an access point (AP), a relay station (RS), or user equipment (UE). A communications node is usually capable of transmitting a signal of the communications node and receiving a signal transmitted by another communications node.

When a wireless signal is transmitted over a wireless channel, attenuation of the wireless signal is very large. Compared with a sending signal of the same communications node, a signal from a communication peer end is very weak when arriving at a receive end. For example, a maximum difference between a power of a sending signal and a power of a received signal may reach a range from 80 dB to 140 dB, or may even exceed 140 dB. A wireless signal is usually sent or received by using different frequency bands or time periods for distinguishing, to avoid self-interference (SI), of a sending signal sent by a transceiver, on a radio frequency signal received by the same transceiver. For example, in a wireless communications system using a frequency division duplex (FDD) mode, for a sending signal and a received radio frequency signal, a guard band is used for communication. In a wireless communications system using a time division duplex (TDD) mode, for a sending signal and a received radio frequency signal, a guard interval is used for communication. Both the guard band and the guard interval are used to ensure that the received radio frequency signal and the sending signal are thoroughly separately, and avoid interference of the sending signal on the received radio frequency signal.

In a wireless communications system using a wireless full-duplex mode, one transceiver is used to simultaneously receive and send signals over a same wireless channel. The wireless communications system using the wireless full-duplex mode needs to avoid, reduce, and cancel self-interference, of a sending signal sent by a transceiver, on a radio frequency signal received by the same transceiver as much as possible, to reduce impact generated when a desired signal is received.

A radio frequency self-interference cancellation module needs to be disposed in the wireless communications system using the wireless full-duplex mode, to cancel interference caused by the sending signal on the received radio frequency signal. A quantity of taps in the radio frequency self-interference cancellation module needs to be increased, to ensure an interference cancellation capability of the radio frequency self-interference cancellation module. To be specific, more taps need to be added to the radio frequency self-interference cancellation module to cover more reflection transmission paths, to cancel more self-interference signals. If the quantity of taps in the radio frequency self-interference cancellation module is small, a capability to cancel the self-interference signal is limited. If the quantity of taps in the radio frequency self-interference cancellation module is large, an area of the radio frequency self-interference cancellation module and module implementation complexity need to be increased. This is not conducive to miniaturization and a chip-based design of the radio frequency self-interference cancellation module.

SUMMARY

Embodiments of this application provide a full-duplex self-interference cancellation method and apparatus, to improve a full-duplex self-interference cancellation capability, and reduce hardware implementation complexity and costs of self-interference cancellation.

To resolve the foregoing technical problem, the embodiments of this application provide the following technical solutions.

According to a first aspect, an embodiment of this application provides a full-duplex self-interference cancellation method. The full-duplex self-interference cancellation method may be applied to the field of radio frequency self-interference cancellation in a full-duplex scenario. The full-duplex self-interference cancellation method is implemented by a full-duplex self-interference cancellation apparatus with self-interference reconstruction modules of two levels, and the full-duplex self-interference cancellation apparatus is implemented by a terminal, for example, a transceiver in the terminal. In the method, a sending signal is time reversal-filtered and a time reversal-filtered sending signal is fed into a first self-interference reconstruction module, to obtain a first-level self-interference reconstruction signal; the sending signal is directly fed into a second self-interference reconstruction module, to obtain a second-level self-interference reconstruction signal, where the self-interference reconstruction signals of the two levels are generated independently; and finally, self-interference cancellation is performed, based on the first-level self-interference reconstruction signal and the second-level self-interference reconstruction signal, on a radio frequency signal received by a receive antenna. In this embodiment of this application, the sending signal is separately fed into two different self-interference reconstruction modules in different manners. The time reversal-filtered sending signal is fed into the first self-interference reconstruction module. Alternatively, the sending signal that is not time reversal-filtered may directly be fed into the second self-interference reconstruction module. The sending signal is time reversal-filtered, to obtain an impulse response to a self-interference channel. The impulse response to the self-interference channel is compressed into an impulse response to a channel with a single propagation path or several propagation paths. However, the second self-interference reconstruction module uses the sending signal that is not time reversal-filtered as a reference signal for self-interference reconstruction. Therefore, the second self-interference reconstruction module only needs to reconstruct a self-interference signal on a signal path or self-interference signals on several paths. This greatly reduces hardware implementation complexity and costs of the second self-interference reconstruction module, and improves a full-duplex self-interference cancellation capability.

In an embodiment of the first aspect, the second self-interference reconstruction module includes a fixed delay line, a variable attenuator, and a variable phase shifter, two ends of the variable attenuator are respectively connected to the fixed delay line and the variable phase shifter, and the sending signal is directly fed into the fixed delay line and sequentially passes through the variable attenuator and the variable phase shifter, to obtain the second-level self-interference reconstruction signal. In this embodiment of this application, the second self-interference reconstruction module needs only one reconstruction branch. The branch includes a fixed delay unit, a variable attenuator, and a variable phase shifter. The variable phase shifter means that a phase value can be adjusted. In this embodiment of this application, only one fixed delay line, one variable attenuator, and one variable phase shifter need to be disposed to obtain the second self-interference reconstruction module. The second self-interference reconstruction module has a single tap. The single tap including a fixed delay line, a variable attenuator, and a variable phase shifter may perform self-interference reconstruction. This reduces a quantity of taps of the second self-interference reconstruction module, reduces an area of the second self-interference reconstruction module, and is conducive to a miniaturization design of a device.

In an embodiment of the first aspect, the second self-interference reconstruction module includes a fixed delay line, a variable attenuator, and a fixed phase shifter, two ends of the variable attenuator are respectively connected to the fixed delay line and the fixed phase shifter, and the sending signal is directly fed into the fixed delay line and sequentially passes through the variable attenuator and the fixed phase shifter, to obtain the second-level self-interference reconstruction signal. In this embodiment of this application, only one fixed delay line, one variable attenuator, and one fixed phase shifter need to be disposed to obtain the second self-interference reconstruction module. The second self-interference reconstruction module has a single tap. The single tap including a fixed delay line, a variable attenuator, and a fixed phase shifter may perform self-interference reconstruction. This reduces a quantity of taps of the second self-interference reconstruction module, reduces an area of the second self-interference reconstruction module, and is conducive to a miniaturization design of a device.

In an embodiment of the first aspect, the sending signal is time reversal-filtered in the following manner:

$y(t)=x(t) \otimes (K \cdot h^*(-t))$, where y(t) indicates the time reversal-filtered sending signal, x(t) indicates the sending signal, $h^*(-t)$ indicates time reversal filtering on x(t), $h^*(-t)$ indicates a conjugate of h(−t), h(−t) indicates time reversal of h(t), h(t) indicates an impulse response to a residual self-interference channel obtained after the first-level self-interference reconstruction signal is canceled from the radio frequency signal received by the receive antenna, and K is a normalized coefficient.

In an embodiment of the first aspect, when a transmit antenna and the receive antenna are not independent, the first self-interference reconstruction module includes: a reconstruction branch configured to reconstruct a self-interference component that enters the receive antenna through reflection, a reconstruction branch configured to reconstruct a self-interference component that enters the receive antenna through leakage, and a combiner configured to combine reconstruction signals of the two reconstruction branches; and the time reversal-filtered sending signal is divided into two signals by using a power divider, the two signals respectively pass through the reconstruction branch configured to reconstruct a self-interference component that enters the receive antenna through reflection and the reconstruction branch configured to reconstruct a self-interference component that enters the receive antenna through leakage, to obtain the two reconstruction signals, and the two reconstruction signals are combined by using the combiner. That the transmit antenna and the receive antenna are not independent means that a same antenna is used for reception and transmission, that is, the transmit antenna and the receive antenna use a same antenna port. Two reconstruction branches may be disposed in the first self-interference reconstruction module, namely, the reconstruction branch configured to reconstruct a self-interference component that enters the receive antenna through reflection and the reconstruction branch configured to reconstruct a self-interference component that enters the receive antenna through leakage. In this embodiment of this application, the first self-interference reconstruction module is mainly configured to reconstruct a self-interference signal propagated on a self-interference main path (with a strongest power). The self-interference signal propagated on the self-interference main path (with the strongest power) may include a sending signal reflected by the antenna port and a sending signal leaked from inside of a circulator (leaked from a transmit end to a received end). Therefore, the two reconstruction branches may be disposed to respectively reconstruct the foregoing two signals. The first self-interference reconstruction module may set a delay of a transmit analog signal, coupled from a transmitter, to a fixed period of time, and perform amplitude modulation, and phase modulation on the transmit analog signal.

In an embodiment of the first aspect, the reconstruction branch configured to reconstruct a self-interference component that enters the receive antenna through reflection includes a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the reconstruction signal of the reconstruction branch. In this embodiment of this application, only one fixed delay line, one fixed attenuator, and one fixed phase shifter need to be disposed to obtain the reconstruction branch configured to reconstruct a self-interference component that enters the receive antenna through reflection. The reconstruction branch configured to reconstruct a self-interference component that enters the receive antenna through reflection has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

In an embodiment of the first aspect, the reconstruction branch configured to reconstruct a self-interference component that enters the receive antenna through leakage includes a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the reconstruction signal of the other reconstruction branch. In this embodiment of this application, only one fixed delay line, one fixed attenuator, and one fixed phase shifter need to be disposed to obtain the reconstruction branch configured to reconstruct a self-interference component that enters the receive antenna through leakage. The reconstruction branch configured to reconstruct a self-interference component that enters the receive antenna through leakage has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

In an embodiment of the first aspect, when a transmit antenna and the receive antenna are independent, the first self-interference reconstruction module includes a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the first-level self-interference reconstruction signal. That the transmit antenna and the receive antenna are independent means that independent antennas are used for reception and transmission, that is, the transmit antenna and the receive antenna use independent antenna ports. In a wireless communications system in which independent antennas are used for reception and transmission, the self-interference signal is a transmit signal propagated on a direct line-of-sight path from the transmit antenna to the receive antenna. Direct line-of-sight propagation is propagation without being reflected by an obstacle, and a delay and a power of the self-interference signal are fixed. In this embodiment of this application, only one fixed delay line, one fixed attenuator, and one fixed phase shifter need to be disposed to obtain the second self-interference reconstruction module. The first self-interference reconstruction module has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

According to a second aspect, an embodiment of this application further provides a full-duplex self-interference cancellation apparatus, including a time reversal filter, configured to time reversal-filter a sending signal; a first self-interference reconstruction module, configured to perform self-interference reconstruction on a time reversal-filtered sending signal, to obtain a first-level self-interference reconstruction signal; a second self-interference reconstruction module, configured to directly perform self-interference reconstruction on the sending signal, to obtain a second-level self-interference reconstruction signal; and a combiner, configured to perform, based on the first-level self-interference reconstruction signal and the second-level self-interference reconstruction signal, self-interference cancellation on a radio frequency signal received by a receive antenna. In this embodiment of this application, the sending signal is separately fed into two different self-interference reconstruction modules in different manners. The time reversal-filtered sending signal is fed into the first self-interference reconstruction module. Alternatively, the sending signal that is not time reversal-filtered may directly be fed into the second self-interference reconstruction module. The sending signal is time reversal-filtered, to obtain an impulse response to a self-interference channel. The impulse response to the self-interference channel is compressed into an impulse response to a channel with a single propagation path or several propagation paths. However, the second self-interference reconstruction module uses the sending signal that is not time reversal-filtered as a reference signal for self-interference reconstruction. Therefore, the second self-interference reconstruction module only needs to reconstruct a self-interference signal on a signal path or self-interference signals on several paths. This greatly reduces hardware implementation complexity and costs of the second self-interference reconstruction module, and improves a full-duplex self-interference cancellation capability.

In an embodiment of the first aspect, the second self-interference reconstruction module includes a fixed delay line, a variable attenuator, and a variable phase shifter, and two ends of the variable attenuator are respectively connected to the fixed delay line and the variable phase shifter.

In an embodiment of the second aspect, the second self-interference reconstruction module includes a fixed delay line, a variable attenuator, and a fixed phase shifter, and two ends of the variable attenuator are respectively connected to the fixed delay line and the fixed phase shifter.

In an embodiment of the second aspect, the time reversal filter is configured to time reversal-filter the sending signal in the following manner:

$\gamma(t)=x(t)\otimes(K\cdot h^*(-t))$, where $\gamma(t)$ indicates the time reversal-filtered sending signal, $x(t)$ indicates the sending signal, $h^*(-t)$ indicates time reversal filtering on $x(t)$, $h^*(-t)$ indicates a conjugate of $h(-t)$, $h(-t)$ indicates time reversal of $h(t)$, $h(t)$ indicates an impulse response to a residual self-interference channel obtained after the first-level self-interference reconstruction signal is canceled from the radio frequency signal received by the receive antenna, and K is a normalized coefficient.

In an embodiment of the second aspect, when a transmit antenna and the receive antenna are not independent, the first self-interference reconstruction module includes: a reconstruction branch configured to reconstruct a self-interference component that enters the receive antenna through reflection, a reconstruction branch configured to reconstruct a self-interference component that enters the receive antenna through leakage, and a combiner configured to combine reconstruction signals of the two reconstruction branches.

In an embodiment of the second aspect, the reconstruction branch configured to reconstruct a self-interference component that enters the receive antenna through reflection includes a fixed delay line, a fixed attenuator, and a fixed phase shifter, and two ends of the fixed attenuator are respectively connected to the fixed delay line and the fixed phase shifter.

In an embodiment of the second aspect, the reconstruction branch configured to reconstruct a self-interference component that enters the receive antenna through leakage includes a fixed delay line, a fixed attenuator, and a fixed phase shifter, and two ends of the fixed attenuator are respectively connected to the fixed delay line and the fixed phase shifter.

In an embodiment of the second aspect, when a transmit antenna and the receive antenna are independent, the first self-interference reconstruction module includes a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line.

In the second aspect of this application, modules included in the full-duplex self-interference cancellation apparatus may further perform the steps described in the first aspect and the embodiments. For details, refer to the description of the first aspect and the embodiments.

According to a third aspect, an embodiment of this application further provides a full-duplex self-interference channel measurement method, including: performing first-level self-interference cancellation on a sending signal in a half-duplex timeslot, to obtain a first residual self-interference signal; performing residual self-interference channel estimation based on the first residual self-interference signal, to obtain an impulse response to a first residual self-interference channel; time reversal-filtering the sending signal based on the impulse response to the first residual self-interference channel; performing first-level self-interference cancellation on a time reversal-filtered sending signal, to obtain a second residual self-interference signal; performing second-level self-interference cancellation on the second residual self-interference signal, to obtain a third residual self-interference signal; and performing residual self-interference channel estimation based on the third residual self-interference signal, to obtain an impulse response to a second residual self-interference channel, where the impulse response to the second residual self-interference channel is applied to digital interference cancellation in a full-duplex timeslot. In this embodiment of this application, first-level radio frequency self-interference cancellation may first be performed in the half-duplex timeslot, to cancel a self-interference component with a strongest power; then, residual self-interference channel estimation is performed based on the residual self-interference signal on a digital baseband for the first time; and finally, a sent original baseband signal is time reversal-filtered based on the estimated impulse response to the first residual self-interference channel. The self-interference cancellation of the two levels is performed on the time reversal-filtered sending signal, and residual self-interference channel estimation is performed based on the residual self-interference signal on the digital baseband for the second time, where the residual self-interference channel estimation for the second time is used by the following digital baseband interference cancellation module in a full-duplex timeslot. In the full-duplex timeslot, a downlink signal is sent and an uplink signal is received. A receiver reconstructs and cancels a self-interference component by using a self-interference channel estimated in the half-duplex timeslot, to receive the uplink signal.

According to a fourth aspect, an embodiment of this application further provides a full-duplex self-interference cancellation system. The full-duplex self-interference cancellation system includes a first self-interference cancellation apparatus and a second self-interference cancellation apparatus. The first self-interference cancellation apparatus includes a first time reversal filter, a second time reversal filter, a first self-interference reconstruction module, a second self-interference reconstruction module, and a first combiner. The second self-interference cancellation apparatus includes a third time reversal filter, a fourth time reversal filter, a third self-interference reconstruction module, a fourth self-interference reconstruction module, and a second combiner.

For the full-duplex self-interference cancellation system, the following describes in detail functions of components in the system.

The second time reversal filter is configured to time reversal-filter a first sending signal.

The first time reversal filter is configured to time reversal-filter a time reversal-filtered first sending signal output by the second time reversal filter.

The fourth time reversal filter is configured to time reversal-filter a second sending signal.

The third time reversal filter is configured to time reversal-filter a time reversal-filtered second sending signal output by the fourth time reversal filter.

The first self-interference reconstruction module is configured to perform self-interference reconstruction on a first sending signal time reversal-filtered by the first time reversal filter and the second time reversal filter and on a second sending signal time reversal-filtered by the third time reversal filter and the fourth time reversal filter, to obtain a first-level self-interference reconstruction signal.

The second self-interference reconstruction module is configured to perform self-interference reconstruction on the first sending signal time reversal-filtered by the second time reversal filter and on the second sending signal time reversal-filtered by the fourth time reversal filter, to obtain a second-level self-interference reconstruction signal.

The first combiner is configured to perform, based on the first-level self-interference reconstruction signal and the second-level self-interference reconstruction signal, self-interference cancellation on a radio frequency signal received by a first receive antenna.

The third self-interference reconstruction module is configured to perform self-interference reconstruction on the first sending signal time reversal-filtered by the first time reversal filter and the second time reversal filter and on the second sending signal time reversal-filtered by the third time reversal filter and the fourth time reversal filter, to obtain a third-level self-interference reconstruction signal.

The fourth self-interference reconstruction module is configured to perform self-interference reconstruction on the first sending signal time reversal-filtered by the first time reversal filter and on the second sending signal time reversal-filtered by the fourth time reversal filter, to obtain a fourth-level self-interference reconstruction signal.

The second combiner is configured to perform, based on the third-level self-interference reconstruction signal and the fourth-level self-interference reconstruction signal, self-interference cancellation on a radio frequency signal received by a second receive antenna.

The first time reversal filter in the first self-interference cancellation apparatus needs to be connected to the first self-interference reconstruction module, the second time reversal filter, and the third self-interference reconstruction module and the fourth self-interference reconstruction module in the second self-interference cancellation apparatus.

According to a fifth aspect, an embodiment of this application further provides a full-duplex self-interference cancellation method. The method is used by a full-duplex self-interference cancellation system, and the full-duplex self-interference cancellation system includes a first self-interference cancellation apparatus and a second self-interference cancellation apparatus.

The first self-interference cancellation apparatus includes a first time reversal filter, a second time reversal filter, a first self-interference reconstruction module, a second self-interference reconstruction module, and a first combiner.

The second self-interference cancellation apparatus includes a third time reversal filter, a fourth time reversal filter, a third self-interference reconstruction module, a fourth self-interference reconstruction module, and a second combiner.

Based on the full-duplex self-interference cancellation system, the full-duplex self-interference cancellation method provided in this embodiment of this application includes:

the first time reversal filter and the second time reversal filter time reversal-filter a first sending signal, and then a time reversal-filtered first sending signal is fed into the first self-interference reconstruction module, and the third time reversal filter and the fourth time reversal filter time reversal-filter a second sending signal, and then a time reversal-filtered second sending signal is fed into the first self-interference reconstruction module, to obtain a first-level self-interference reconstruction signal;

the second time reversal filter time reversal-filters the first sending signal, and a time reversal-filtered first sending signal is directly fed into the second self-interference reconstruction module, and the third time reversal filter time reversal-filters the second sending signal, and a time reversal-filtered second sending signal is directly fed into the second self-interference reconstruction module, to obtain a second-level self-interference reconstruction signal;

the first-level self-interference reconstruction signal and the second-level self-interference reconstruction signal are input to the first combiner, and the first combiner performs self-interference cancellation on a radio frequency signal received by a first receive antenna;

the first time reversal filter and the second time reversal filter time reversal-filter the first sending signal, and then the time reversal-filtered first sending signal is fed into the third self-interference reconstruction module, and the third time reversal filter and the fourth time reversal filter time reversal-filter the second sending signal, and then the time reversal-filtered second sending signal is fed into the third self-interference reconstruction module, to obtain a third-level self-interference reconstruction signal;

the first time reversal filter time reversal-filters the first sending signal, and a time reversal-filtered first sending signal is directly fed into the fourth self-interference reconstruction module, and the fourth time reversal filter time reversal-filters the second sending signal, and a time reversal-filtered second sending signal is directly fed into the fourth self-interference reconstruction module, to obtain a fourth-level self-interference reconstruction signal; and the third-level self-interference reconstruction signal and the fourth-level self-interference reconstruction signal are input to the second combiner, and the second combiner performs self-interference cancellation on a radio frequency signal received by a second receive antenna.

That the second time reversal filter time reversal-filters the first sending signal means that the first sending signal is processed only by the second time reversal filter and is not processed by the first time reversal filter. That the first time reversal filter and the second time reversal filter time reversal-filter the first sending signal means that the first sending signal is first processed by the second time reversal filter and then processed by the first time reversal filter. Similarly, that the fourth time reversal filter time reversal-filters the second sending signal means that the second sending signal is processed only by the fourth time reversal filter and is not processed by the third time reversal filter. That the third time reversal filter and the fourth time reversal filter time reversal-filter the second sending signal means that the first sending signal is first processed by the fourth time reversal filter and then processed by the third time reversal filter. In a MIMO scenario, when a quantity of antennas is large, taps for the antennas need to be added to each self-interference cancellation apparatus, to cancel a sending signal from another antenna. Self-interference cancellation in the MIMO scenario is further implemented in this embodiment of this application.

According to a sixth aspect, this application provides a computer-readable storage medium. The computer-readable storage medium stores instructions, and when the instructions are run on a computer, the computer is enabled to perform the method in the first aspect, the third aspect, or the fifth aspect.

According to a seventh aspect, an embodiment of this application provides a computer program product including instructions. When the computer program product is run on a computer, the computer is enabled to perform the method in the first aspect, the third aspect, or the fifth aspect.

According to an eighth aspect, this application provides a chip system. The chip system includes a processor, configured to support a full-duplex self-interference cancellation apparatus to implement functions in the foregoing aspects, for example, sending or processing data and/or information in the foregoing method. In a possible design, the chip system further includes a memory. The memory is configured to store program instructions and data that are necessary for the full-duplex self-interference cancellation apparatus. The chip system may include a chip, or may include a chip and another discrete component.

DESCRIPTION OF EMBODIMENTS

Embodiments of this application provide a full-duplex self-interference cancellation method and apparatus, to improve a full-duplex self-interference cancellation capability, and reduce hardware implementation complexity and costs of self-interference cancellation.

The following describes the embodiments of this application with reference to the accompanying drawings.

In the specification, claims, and the accompanying drawings of this application, terms "first", "second", and the like are intended to distinguish similar objects but do not necessarily indicate a specific order or sequence. It should be understood that the terms used in such a way are interchangeable in proper cases. This is merely a discrimination manner that is used when objects having a same attribute are described in the embodiments of this application. In addition, terms "include", "contain" and any other variants mean to cover the non-exclusive inclusion, so that a process, method, system, product, or device that includes a series of units is not limited to those units, but may include other units not expressly listed or inherent to such a process, method, system, product, or device.

Figure 1:
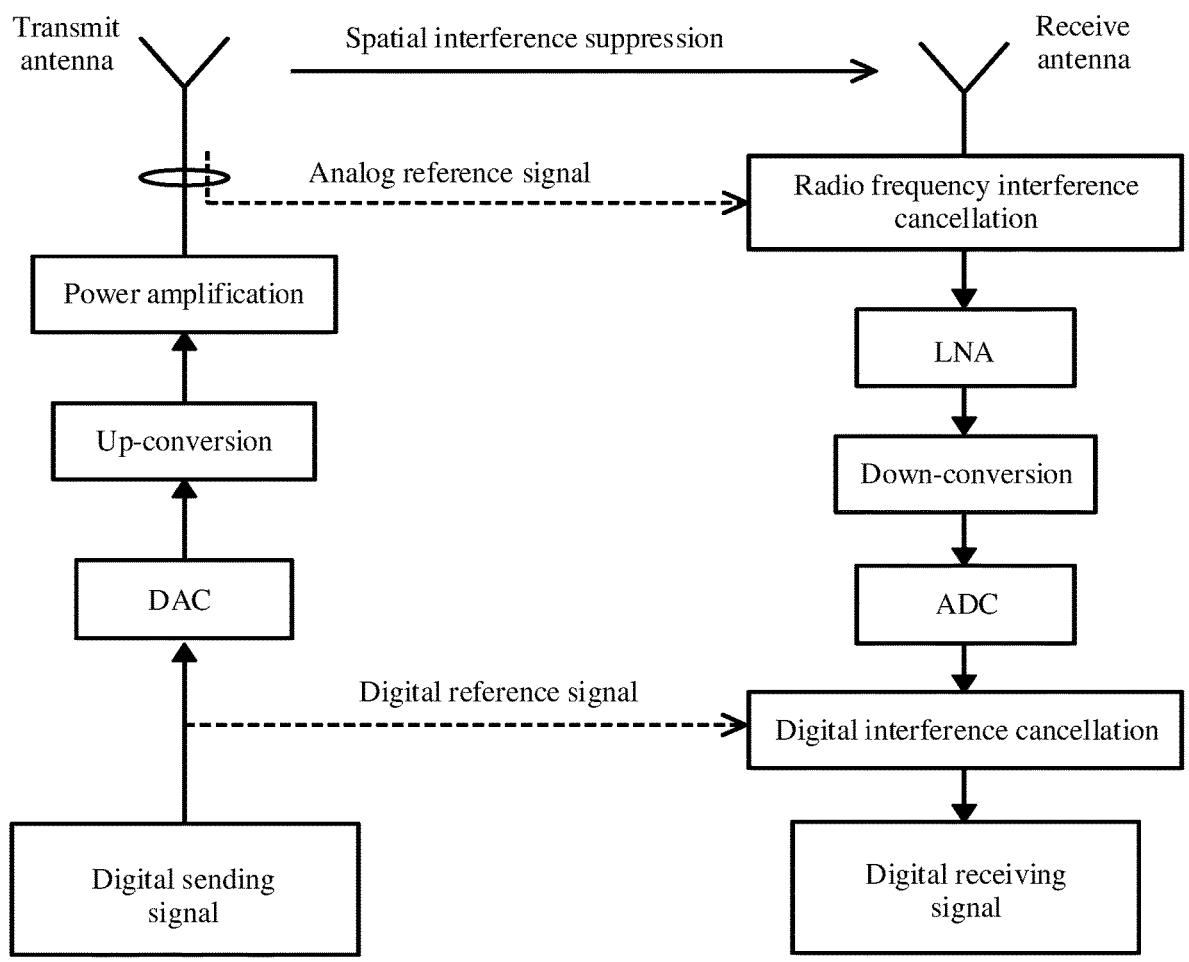
FIG. 1 is a block diagram of an interference cancellation principle of a wireless full-duplex system according to an embodiment of this application.

Technical solutions in the embodiments of this application may be applied to a wireless full-duplex system. FIG. 1 is a block diagram of an interference cancellation principle of a wireless full-duplex system according to an embodiment of this application. In the wireless full-duplex system, a digital signal is first processed to generate a sending signal, the sending signal is processed through digital-to-analog conversion (DAC), up-conversion, and power amplification, and then sent through a transmit antenna. Then, a radio frequency signal is received through a receive antenna. After the receive antenna receives the radio frequency signal, the received radio frequency signal is processed through radio frequency interference cancellation, low noise amplification (LNA), down-conversion, analog-to-digital conversion (ADC), and digital interference cancellation. Then, a received digital signal is processed. Self-interference in the sending signal may be canceled by using a process such as spatial interference suppression, radio frequency interference cancellation, or digital interference cancellation shown in FIG. 1. In the wireless full-duplex system, radio frequency interference cancellation mainly cancels a self-interference signal on a main path with a relatively strong power. Digital interference cancellation is a supplement to radio frequency interference cancellation, and cancels a residual self-interference signal (namely, a multi-path interference signal reflected by surrounding objects) in the received radio frequency signal on a baseband. Performance of digital interference cancellation is mainly limited by a dynamic range of the ADC. For example, the dynamic range may be from 40 dB to 60 dB.

Figure 2:
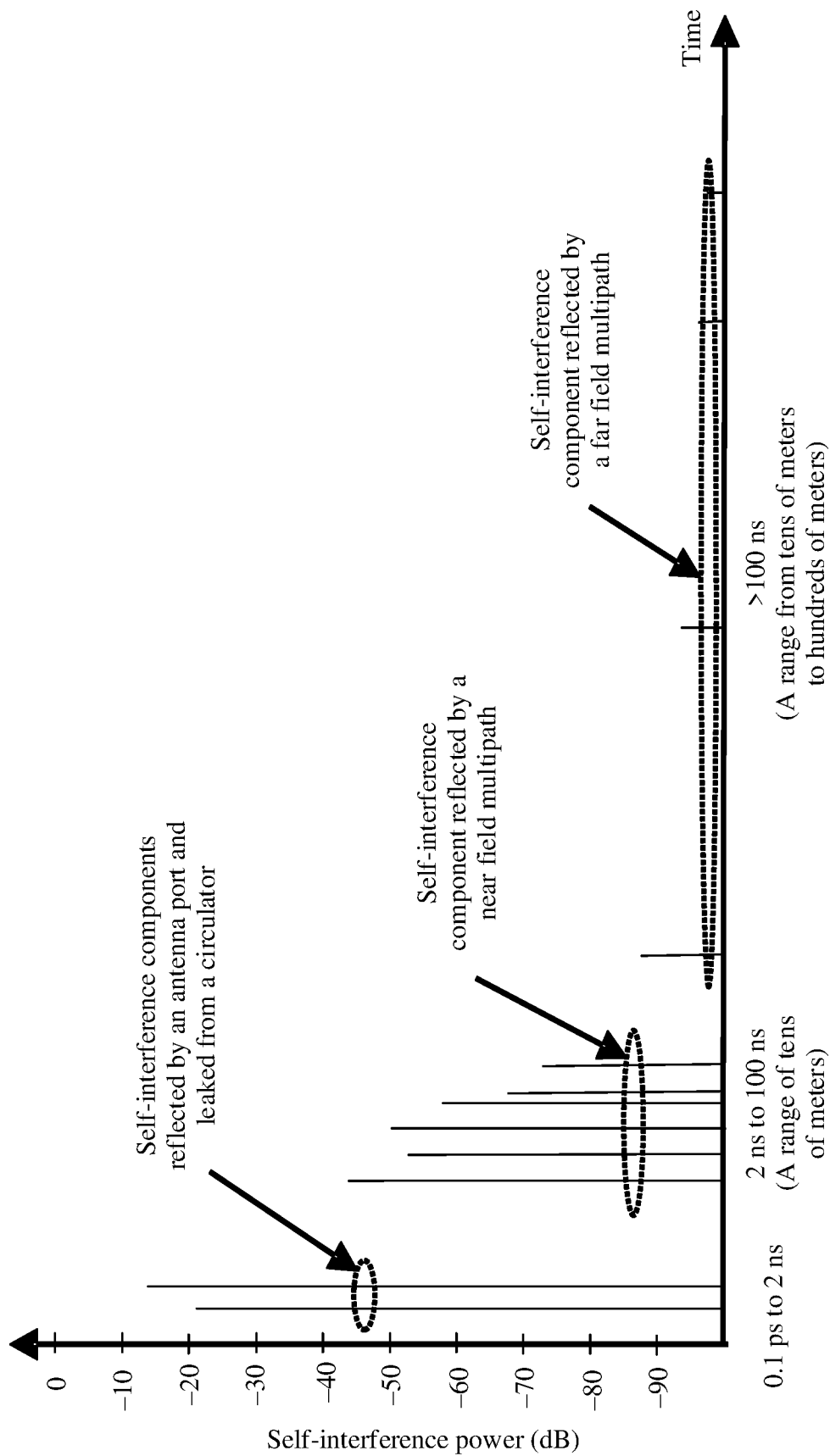
FIG. 2 is a schematic diagram of constitution of a received self-interference signal in a wireless full-duplex system according to an embodiment of this application.

Because the performance of digital interference cancellation is limited, and an LNA is easily overloaded caused by preventing a self-interference signal with an excessively strong power from entering the LNA of a receiver, a self-interference suppression capability of the wireless full-duplex system can only be improved by further improving performance of radio frequency interference cancellation. FIG. 2 is a schematic diagram of constitution of a received self-interference signal in a wireless full-duplex system according to an embodiment of this application. In a wireless communications system in which a same antenna is used for reception and transmission and a circulator is used for reception and transmission isolation, it can be learned from analyzing constitution of a received self-interference signal in the wireless full-duplex system that more self-interference signal components may be canceled by using a radio frequency interference cancellation procedure in this embodiment of this application. A self-interference signal with a strongest power received by a receiver includes a sending signal reflected by an antenna port and a sending signal leaked from inside of the circulator (leaked from a transmit end to a received end). A delay and a power of the self-interference signal are related only to hardware of a device (for example, an antenna, a circulator, or a connection cable in the device), and therefore the delay and the power are fixed values. A self-interference signal with a second strongest power comes from a sending signal reflected by a near field multipath. A delay of the self-interference signal is usually 2 nanoseconds (ns) to 100 nanometers, and a power of the signal is 30 dB to 60 dB less than that of the self-interference signal with the strongest power. The delay and the power vary with a near field environment. A self-interference signal with a relatively weak power comes from a sending signal reflected by a far field multipath. A delay of the self-interference signal is greater than 100 ns. Therefore, a difference between a power of the signal and the power of the self-interference signal with the strongest power is more than 60 dB, and the delay and the power of the self-interference signal may change more frequently than that of the self-interference signal with the second strongest power.

Figure 3:
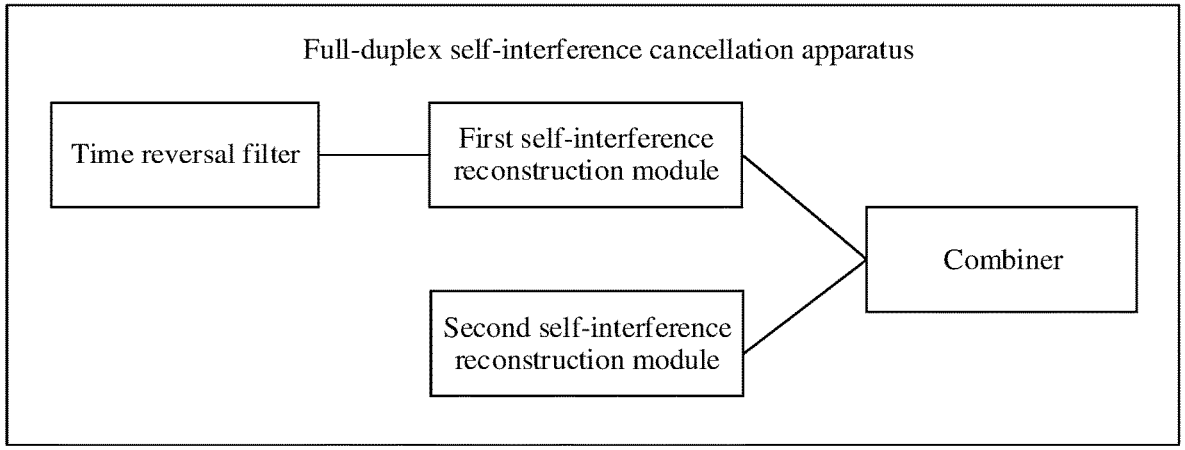
FIG. 3 is a schematic diagram of a structure of a full-duplex self-interference cancellation apparatus according to an embodiment of this application.

To cancel the self-interference signal with the strongest power and the self-interference signal with the second strongest power, a full-duplex self-interference cancellation apparatus provided in this embodiment of this application may be used. FIG. 3 is a schematic diagram of a structure of a full-duplex self-interference cancellation apparatus according to an embodiment of this application. The full-duplex self-interference cancellation apparatus may include a time reversal filter, a first self-interference reconstruction module, a second self-interference reconstruction module, and a combiner. An input end of the time reversal filter is configured to input a sending signal, and an output end of the time reversal filter is connected to an input end of the first self-interference reconstruction module. The input end of the first self-interference reconstruction module is connected to an input end of the combiner, and an input end of the second self-interference reconstruction module is configured to directly input a sending signal. That the sending signal is directly input means that the sending signal is directly input to the second self-interference reconstruction module without being time reversal-filtered, and an output end of the second self-interference reconstruction module is connected to the input end of the combiner.

In the full-duplex self-interference cancellation apparatus in this embodiment of this application, the following describes functions of structural units included in the apparatus.

The time reversal filter is configured to time reversal-filter a sending signal.

The first self-interference reconstruction module is configured to perform self-interference reconstruction on a time reversal-filtered sending signal, to obtain a first-level self-interference reconstruction signal.

The second self-interference reconstruction module is configured to directly perform self-interference reconstruction on the sending signal, to obtain a second-level self-interference reconstruction signal.

The combiner is configured to perform, based on the first-level self-interference reconstruction signal and the second-level self-interference reconstruction signal, self-interference cancellation on a radio frequency signal received by a receive antenna.

The time reversal filter has a function of time reversal filtering. The time reversal filter may be configured to time reversal-filter a directly input sending signal. A time reversal-filtered sending signal may be sent over a transmit channel shown in FIG. 3. In addition, the time reversal-filtered sending signal may alternatively be processed by using a DAC, through up-conversion, power amplification, and the like as shown in FIG. 3. A specific procedure is not described again.

Figure 4:
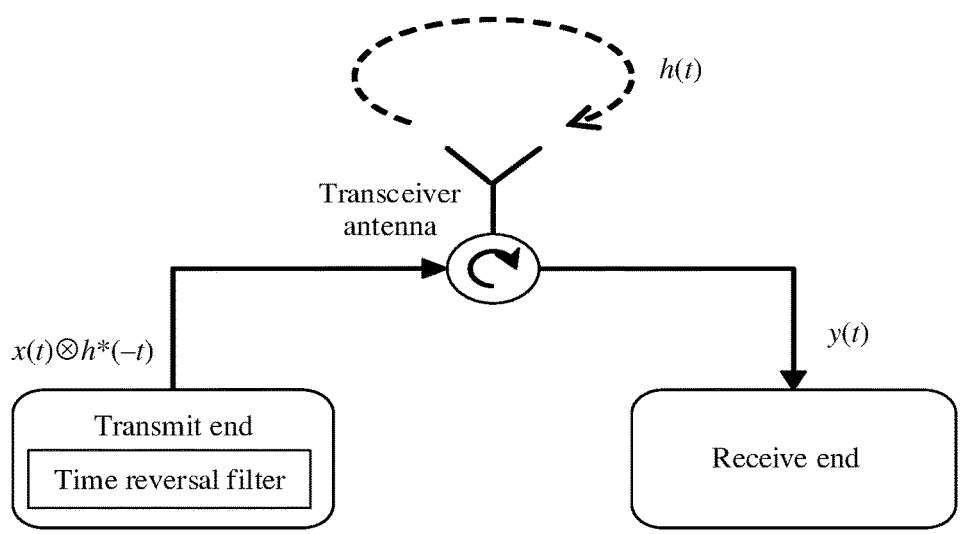
FIG. 4 is a schematic diagram of a principle of time reversal-filtering a sending signal according to an embodiment of this application.

The following describes an example procedure in which the time reversal filter time reversal-filters the sending signal. FIG. 4 is a schematic diagram of a principle of time reversal-filtering a sending signal according to an embodiment of this application. When a transmit antenna and a receive antenna are not independent (that is, a same antenna is used for reception and transmission), an example in which an original baseband signal is $x(t)$ is used. A transmit end includes a time reversal filter, a time domain impulse response to a radio air interface channel is $h(t)$, and a radio frequency signal received by the receive antenna is $y(t)$. A sending signal first passes through a time reversal filter (a filter for short) whose time domain impulse response is $h^*(-t)$, and the sending signal is time reversal-filtered in time domain, to implement channel pre-equalization in frequency domain. The sending signal is $x(t) \otimes h^*(-t)$. After passing through the wireless channel, theoretically, the received radio frequency signal is a signal sent at a moment t without interference of another multipath, and an impulse signal is obtained through $h(t) \otimes h^*(-t)$.

Based on the foregoing time reversal filter, in this embodiment of this application, a self-interference channel with a relatively large quantity of propagation paths and a relatively large delay spread may be compressed into a self-interference channel with a few propagation paths (for example, a single path or several propagation paths) and a small delay spread through time reversal filtering. A delay spread is a difference between a minimum delay and a maximum delay. As shown in FIG. 2, a delay spread of the self-interference signal reflected by the near field multipath is 100 ns.

Figure 5A:
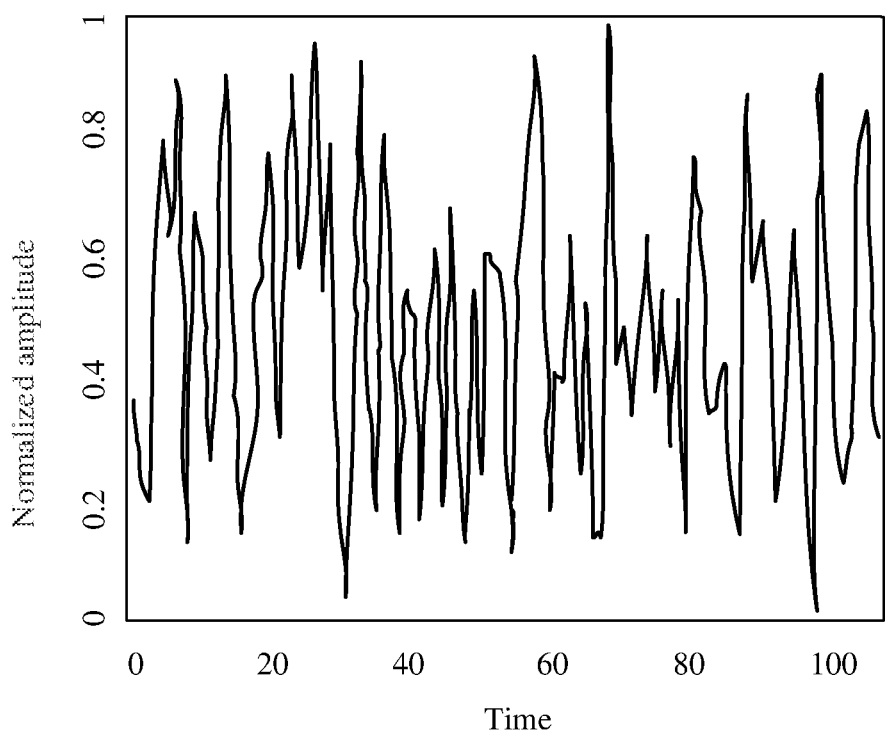
FIG. 5a is a schematic diagram of a signal curve of a randomly generated impulse response to a channel according to an embodiment of this application.
Figure 5B:
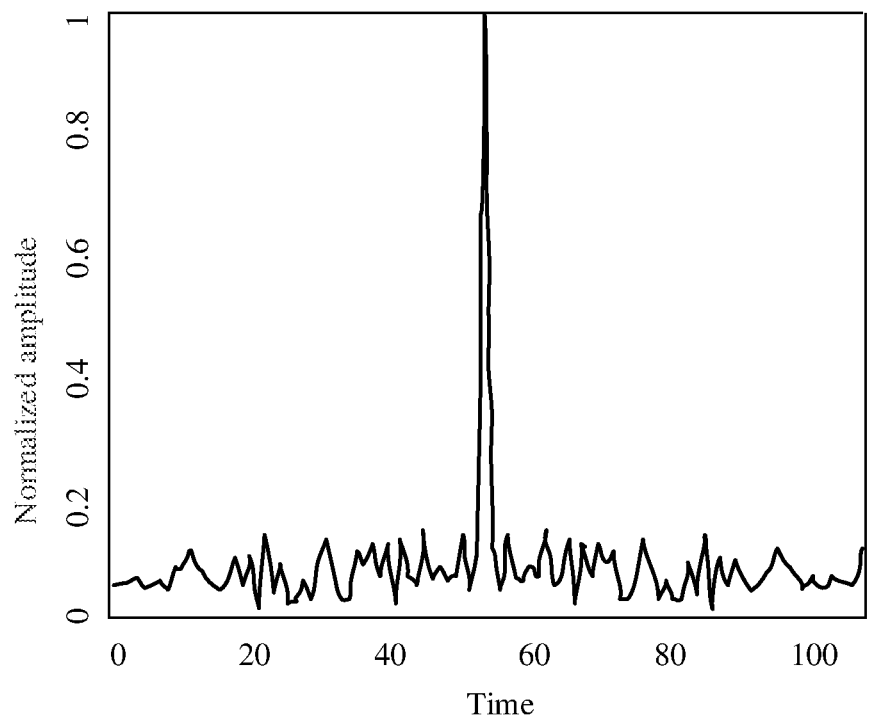
FIG. 5b is a schematic diagram of a curve of a time reversal-filtered signal according to an embodiment of this application.

FIG. 5a is a schematic diagram of a signal curve of a randomly generated impulse response to a channel according to an embodiment of this application. FIG. 5b is a schematic diagram of a curve of a time reversal-filtered signal according to an embodiment of this application. In FIG. 5a, the randomly generated impulse response to a channel may be indicated as $h(t)$, and a time reversal-filtered signal may be $h(t) \otimes h^*(-t)$, where $\otimes$ indicates a convolution operation, $h^*(t)$ is a conjugate operation of $h(t)$, and $h^*(-t)$ is a result obtained after a time sequence of $h(t)$ is reversed and then a conjugate is obtained. The obtained impulse response to a channel is approximately an impulse response to a channel with a single propagation path (or several propagation paths), as the signal curve shown in FIG. 5b. If there is no error in estimation for $h(t)$, the propagation path is a single path. If there is an error in estimation for $h(t)$, several paths exist.

The full-duplex self-interference cancellation apparatus in this embodiment of this application may include self-interference reconstruction modules of two levels, namely, the first self-interference reconstruction module and the second self-interference reconstruction module. In this embodiment of this application, signals input to the self-interference reconstruction modules of two levels are different. The first self-interference reconstruction module is connected to the time reversal filter, and the sending signal input to the first self-interference reconstruction module is the time reversal-filtered sending signal, and the first self-interference reconstruction module performs self-interference reconstruction on the time reversal-filtered sending signal, to obtain the first-level self-interference reconstruction signal. The sending signal is directly input to the second self-interference reconstruction module (that is, the sending signal is not time reversal-filtered), and the second self-interference reconstruction module directly performs self-interference reconstruction on the sending signal, to obtain the second-level self-interference reconstruction signal.

In some embodiments of this application, the self-interference reconstruction modules of two levels may output the first-level self-interference reconstruction signal and the second-level self-interference reconstruction signal, and the first-level self-interference reconstruction signal, the second-level self-interference reconstruction signal, and a radio frequency signal received by a receiver are all input to the combiner for self-interference cancellation, to improve radio frequency self-interference cancellation performance.

In some other embodiments of this application, after the first-level self-interference reconstruction signal is obtained, self-interference cancellation may be performed on the received radio frequency signal based on the first-level self-interference reconstruction signal, to obtain a residual self-interference signal after first-level self-interference cancellation and a desired signal sent by a far end. Then, self-interference cancellation is performed on the second-level self-interference reconstruction signal and the residual self-interference signal obtained after first-level self-interference cancellation, to improve radio frequency self-interference cancellation performance.

Based on the foregoing time reversal filter, if an impulse response to a self-interference channel h(t) is estimated in a wireless transmitter, and a sending signal x(t) is time reversal-filtered, that is, $x(t) \otimes h^*(-t)$, the signal enters the receiver after passing through the self-interference channel. As shown in FIG. 4, a received radio frequency signal is indicated as γ(t), and $\gamma(t)=x(t) \otimes h^*(-t) \otimes h(t)$ is obtained, where x(t) is a sent self-interference signal, an impulse response to a self-interference channel is $h^*(-t) \otimes h(t)=h(t) \otimes h^*(-t)$, and an impulse response to the self-interference channel obtained after time reversal filtering is compressed into an impulse response to a channel with a single propagation path or several propagation paths. However, that a self-interference signal is reconstructed on a single path or self-interference signals on several paths greatly reduces implementation complexity of a radio frequency interference cancellation module, and improves radio frequency self-interference cancellation performance.

Figure 6:
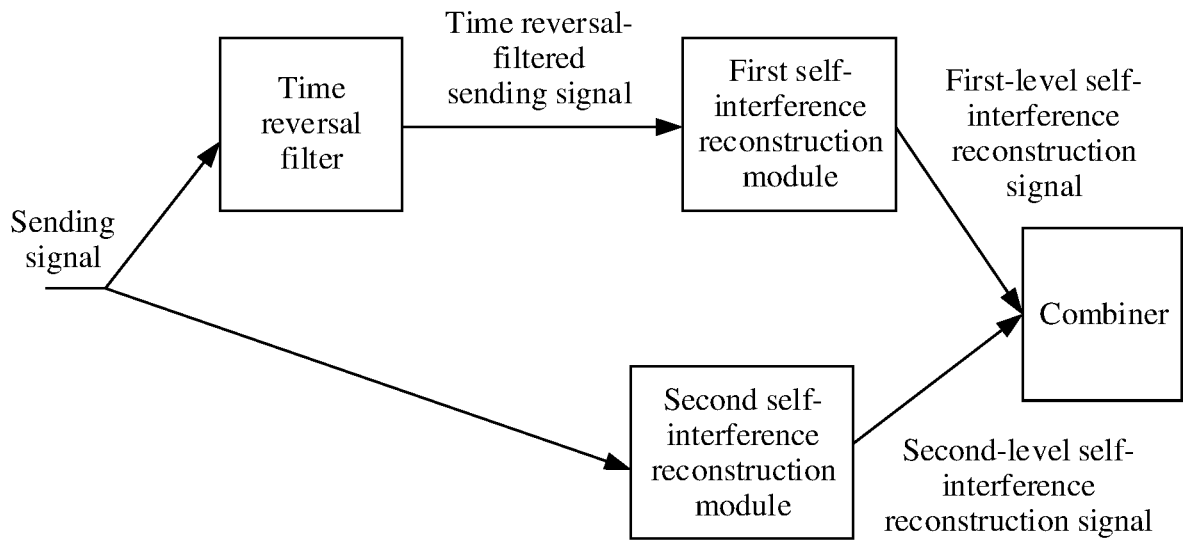
FIG. 6 is a schematic block flowchart of a full-duplex self-interference cancellation method according to an embodiment of this application.

FIG. 6 shows a full-duplex self-interference cancellation method according to an embodiment of this application. The full-duplex self-interference cancellation method mainly includes the following steps.

S01: Time reversal-filter a sending signal and feed a time reversal-filtered sending signal into a first self-interference reconstruction module, to obtain a first-level self-interference reconstruction signal.

S02: Directly feed the sending signal into a second self-interference reconstruction module, to obtain a second-level self-interference reconstruction signal.

S03: Perform, based on the first-level self-interference reconstruction signal and the second-level self-interference reconstruction signal, self-interference cancellation on a radio frequency signal received by a receive antenna.

In this embodiment of this application, the sending signal is time reversal-filtered and the time reversal-filtered sending signal is fed into the first self-interference reconstruction module, to obtain the first-level self-interference reconstruction signal; the sending signal is directly fed into the second self-interference reconstruction module, to obtain the second-level self-interference reconstruction signal; and finally, self-interference cancellation is performed, based on the first-level self-interference reconstruction signal and the second-level self-interference reconstruction signal, on the radio frequency signal received by the receive antenna. In this embodiment of this application, the sending signal is separately fed into two different self-interference reconstruction modules in different manners. The time reversal-filtered sending signal is fed into the first self-interference reconstruction module. Alternatively, the sending signal that is not time reversal-filtered may directly be fed into the second self-interference reconstruction module. The sending signal is time reversal-filtered, to obtain an impulse response to a self-interference channel. The impulse response to the self-interference channel is compressed into an impulse response to a channel with a single propagation path or several propagation paths. However, the second self-interference reconstruction module uses the sending signal that is not time reversal-filtered as a reference signal for self-interference reconstruction. Therefore, the second self-interference reconstruction module only needs to reconstruct a self-interference signal on a signal path or self-interference signals on several paths. This greatly reduces hardware implementation complexity and costs of the second self-interference reconstruction module, and improves a full-duplex self-interference cancellation capability.

There is no logical sequence between step S01 and step S02. Step S01 may be performed before step S02, step S02 may be performed before step S01, or step S01 and step S02 may be performed at the same time. This is not limited herein, and a specific execution sequence may be determined based on clock control logic in a full-duplex self-interference cancellation application scenario, and hardware configurations and software execution logic of the first self-interference reconstruction module and the second self-interference reconstruction module.

The full-duplex self-interference cancellation apparatus in this embodiment of this application may include the self-interference reconstruction modules of two levels, namely, the first self-interference reconstruction module and the second self-interference reconstruction module. To improve a full-duplex self-interference cancellation capability, the self-interference reconstruction modules of two levels are indispensable. If the apparatus only includes the first self-interference reconstruction module without the second self-interference reconstruction module, a sending signal passing through a self-interference channel is received and self-interference channel estimation is performed on the sending signal on a digital baseband. For example, conversion by using an ADC is performed on all self-interference signal components shown in FIG. 2 to obtain the digital baseband, and self-interference channel estimation is performed. Then, the sending signal is time reversal-filtered. This does not improve radio frequency interference cancellation performance, but increases complexity of digital interference cancellation and affects the performance. A reason is as follows: A difference between powers of the self-interference signal components is usually greater than 80 dB, far exceeding a dynamic range (from 40 dB to 60 dB) of the ADC. This indicates that self-interference channel estimation performed in digital domain is not accuracy enough, and a residual self-interference signal obtained after radio frequency interference cancellation is quantization noise and cannot be canceled in the digital domain. In addition, a self-interference signal component with a large power directly enters an LNA in a receiver, the LNA is overloaded, and a non-linear effect of the LNA is caused. This increases complexity of digital interference cancellation and affects digital interference cancellation performance.

Figure 7:
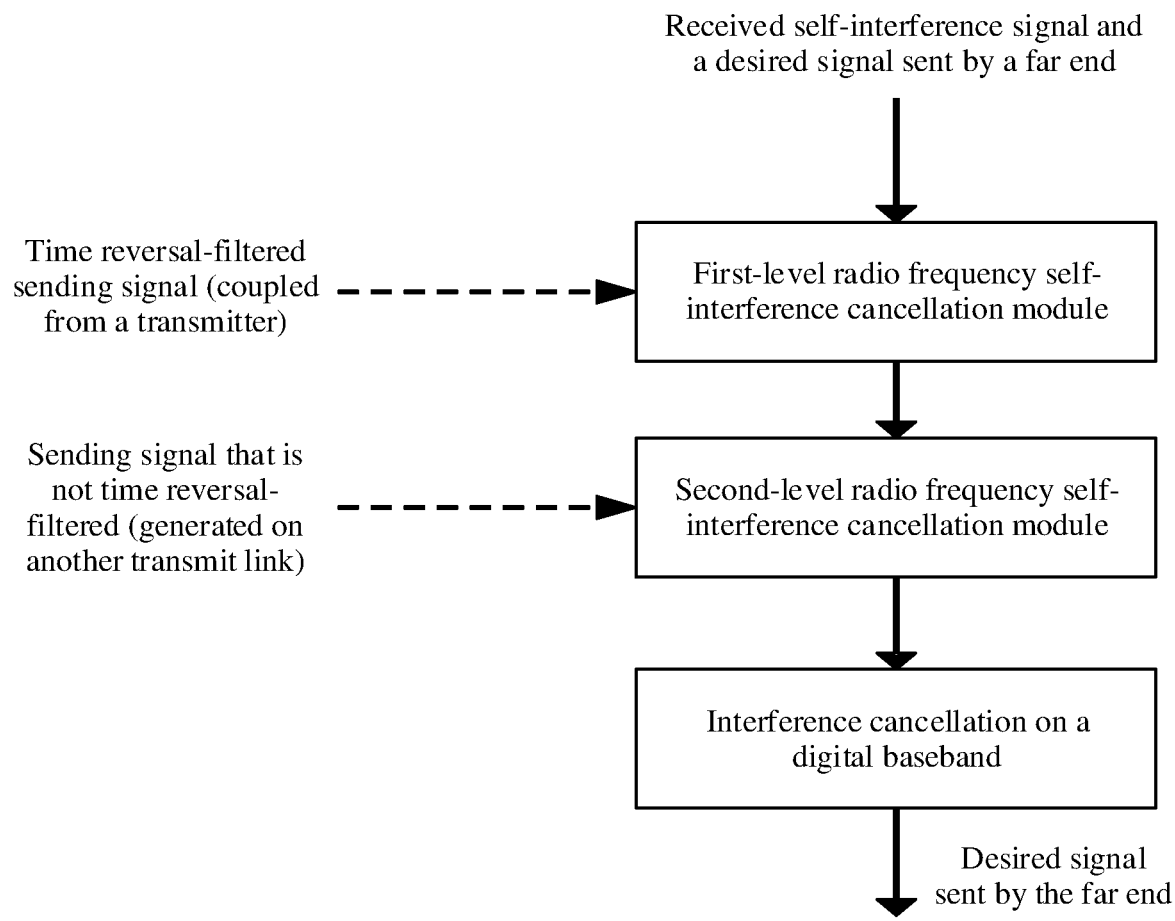
FIG. 7 is a basic flowchart of a self-interference cancellation method according to an embodiment of this application.

Therefore, this embodiment of this application combines time reversal filtering and radio frequency interference cancellation of two levels, and provides a basic flowchart of a self-interference cancellation method shown in FIG. 7. As shown in FIG. 7, a radio frequency signal received by a receive antenna may include a self-interference signal sent by a local transmitter and a desired signal sent by a far end. First, radio frequency interference cancellation is performed on the received radio frequency signal. In this embodiment of this application, a two-level radio frequency interference cancellation architecture is used. A first-level radio frequency interference cancellation module directly couples, from the transmitter, a time reversal-filtered sending signal for self-interference reconstruction, and a self-interference component with a strongest power may be reconstructed.

The time reversal-filtered sending signal may be used for self-interference signal reconstruction, and self-interference cancellation is performed after reconstruction is completed. Therefore, the received radio frequency signal cancels out a first-level self-interference reconstruction signal. A transmit link is specially arranged before a second-level radio frequency interference cancellation module, and a sending signal that is not time reversal-filtered is input to the second-level radio frequency interference cancellation module. The second-level radio frequency interference cancellation module performs self-interference reconstruction on an original sending signal generated on the transmit link (including a DAC and up-conversion) that is not time reversal-filtered, and only reconstructs self-interference components of a single compressed propagation path or several compressed propagation paths. A residual self-interference component obtained after radio frequency interference cancellation of two levels is further canceled on a digital baseband, to obtain a desired signal sent by a far end. It should be noted that the first-level radio frequency self-interference cancellation module may cancel the self-interference component with the strongest power, and the second-level radio frequency self-interference cancellation module may cancel a self-interference component reflected by a near field.

In some embodiments of this application, the sending signal is time reversal-filtered in the following manner:

$\gamma(t) = x(t) \otimes (K \cdot h^*(-t))$, where $\gamma(t)$ indicates the time reversal-filtered sending signal, $x(t)$ indicates the sending signal, $h^*(-t)$ indicates time reversal filtering on $x(t)$, $h^*(-t)$ indicates a conjugate of $h(-t)$, $h(-t)$ indicates time reversal of $h(t)$, $h(t)$ indicates an impulse response to a residual self-interference channel obtained after the first-level self-interference reconstruction signal is canceled from the radio frequency signal received by the receive antenna, and K is a normalized coefficient.

In this embodiment of this application, $h(t)$ indicates an impulse response to the residual self-interference channel obtained after the first-level self-interference reconstruction signal is canceled from the radio frequency signal received by the receive antenna, $h(t)$ indicates the impulse response to the residual self-interference channel obtained after the first-level self-interference reconstruction signal performs self-interference cancellation on the radio frequency signal received by the receive antenna, and an impulse response $h^*(-t)$ to a time reversal filter is obtained by using $h(t)$.

In addition, in an embodiment, normalization processing may further be performed on the estimated impulse response $h(t)$ to the residual self-interference channel obtained after first-level self-interference cancellation is performed. Therefore, a baseband signal obtained after an original baseband signal is time reversal-filtered may be $x_{TR}(t) = K \cdot x(t) \otimes h^*(-t)$.

K is a normalized parameter, K may be represented as $$K = \frac{1}{\sqrt{\sum_n^N |h[n]|^2}},$$

$h[n]$, $n=1, \ldots$, and N is an estimated coefficient. The normalized parameter K may be obtained by using the manner. In an actual application scenario, another calculation manner may further be used according to the foregoing calculation manner of K. For example, an equivalent deformation manner is obtained based on K, provided that an obtained result of $K \cdot h^*(-t)$ is within an interval of (0, 1).

In addition, in this embodiment of this application, $\gamma(t) = x(t) \otimes h^*(-t)$, that is, a value of K may be 1.

The following describes in detail a case in which a first self-interference reconstruction module and a second self-interference reconstruction module reconstruct a sending signal by using an example. It is assumed that a self-interference channel $h_{Sl}(t)$ is represented as:

$h_{Sl}(t) = h_{fix}(t) + h(t)$, where $h_{fix}(t)$ is an impulse response to the first-level self-interference reconstruction module, and $h(t)$ is an impulse response to a residual self-interference channel obtained after first-level self-interference cancellation.

A received self-interference signal is represented as $r(t) = \gamma(t) \otimes h_{Sl}(t)$, and based on $h_{Sl}(t)$, the following may be obtained:

$r(t) = \gamma_{TR}(t) \otimes [h_{fix}(t) + h(t)] = \gamma_{TR}(t) \otimes h_{fix}(t) + \gamma_{TR}(t) \otimes h(t)$.

Because the first self-interference reconstruction module performs self-interference reconstruction by using a coupled transmitted radio frequency signal $\gamma_{TR}(t)$ as a reference signal, and the impulse response to the first self-interference reconstruction module is $h_{fix}(t)$, a residual self-interference signal obtained after first-level self-interference cancellation is performed on $r(t)$ may be represented as:

$r'(t) = \gamma_{TR}(t) \otimes h(t)$.

$\gamma_{TR}(t) = G \cdot [(x(t) \otimes h^*(-t)] \cdot e^{j\omega t}$ is substitute to $r'(t)$, to obtain:

$$r'(t) = G \cdot [x(t) \otimes h^*(-t)] \otimes h(t) \cdot e^{j\omega t} =$$
$$x(t) \cdot e^{j\omega t} \otimes [h^*(-t) \otimes h(t)] \cdot G = y(t) \otimes [h^*(-t) \otimes h(t)] \cdot G.$$

It can be learned from a working principle of the time reversal filter that in the foregoing equation $r'(t)$, the impulse response to a channel with a single propagation path or several propagation paths may be $h^*(-t) \otimes h(t)$. The second self-interference reconstruction module in this embodiment of this application uses a sending signal $x(t) \cdot e^{j\omega t}$ that is not time reversal-filtered as a reference signal.

In some embodiments of this application, the second self-interference reconstruction module is mainly responsible for a self-interference signal that is transmitted from a transmit antenna to the receive antenna and that is reflected by a near field multipath, that is, the signal with the second strongest power shown in FIG. 2. It can be learned from FIG. 2 that reconstructing a self-interference signal reflected by a near field multipath needs to cover a propagation path whose delay is within 100 ns, and a delay and a power of the path need to be adjusted based on a change of a near field environment. The following describes a structure of the second self-interference reconstruction module.

Figure 8A:
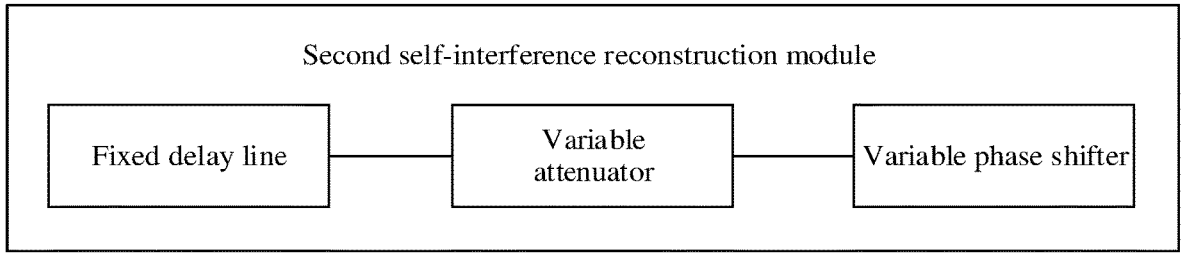
FIG. 8a is a schematic diagram of a structure of a second self-interference reconstruction module according to an embodiment of this application.

FIG. 8a is a schematic diagram of a structure of a second self-interference reconstruction module according to an embodiment of this application. The second self-interference reconstruction module includes a fixed delay line, a variable attenuator, and a variable phase shifter, two ends of the variable attenuator are respectively connected to the fixed delay line and the variable phase shifter, and a sending signal is directly fed into the fixed delay line and sequentially passes through the variable attenuator and the variable phase shifter, to obtain a second-level self-interference reconstruction signal. In this embodiment of this application, the second self-interference reconstruction module needs only one reconstruction branch. The branch includes a fixed delay unit, a variable attenuator, and a variable phase shifter.

The variable phase shifter means that a phase value can be adjusted. In this embodiment of this application, only one fixed delay line, one variable attenuator, and one variable phase shifter need to be disposed to obtain the second self-interference reconstruction module. The second self-interference reconstruction module has a single tap. The single tap including a fixed delay line, a variable attenuator, and a variable phase shifter may perform self-interference reconstruction. This reduces a quantity of taps of the second self-interference reconstruction module, reduces an area of the second self-interference reconstruction module, and is conducive to a miniaturization design of a device.

Figure 8B:
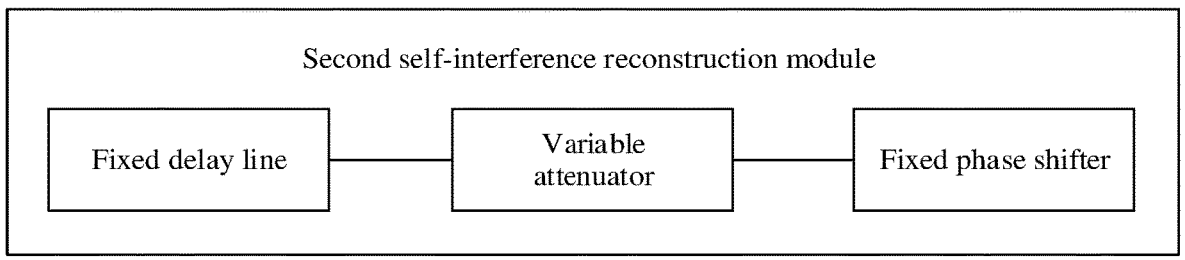
FIG. 8b is a schematic diagram of another structure of a second self-interference reconstruction module according to an embodiment of this application.

In some embodiments of this application, FIG. 8b is a schematic diagram of a structure of a second self-interference reconstruction module according to an embodiment of this application. The second self-interference reconstruction module includes a fixed delay line, a variable attenuator, and a fixed phase shifter, two ends of the variable attenuator are respectively connected to the fixed delay line and the fixed phase shifter, and a sending signal is directly fed into the fixed delay line and sequentially passes through the variable attenuator and the fixed phase shifter, to obtain a second-level self-interference reconstruction signal. In this embodiment of this application, only one fixed delay line, one variable attenuator, and one fixed phase shifter need to be disposed to obtain the second self-interference reconstruction module. The second self-interference reconstruction module has a single tap. The single tap including a fixed delay line, a variable attenuator, and a fixed phase shifter may perform self-interference reconstruction. This reduces a quantity of taps of the second self-interference reconstruction module, reduces an area of the second self-interference reconstruction module, and is conducive to a miniaturization design of a device.

The second self-interference reconstruction module in this embodiment of this application may use a variable phase shifter, or a fixed phase shifter. The second self-interference reconstruction module may be configured based on a specific application scenario. The second self-interference reconstruction module with a single tap may include either of the two phase shifters. Therefore, this reduces an area of the second self-interference reconstruction module, and is conducive to a miniaturization design of a device.

Figure 9A:
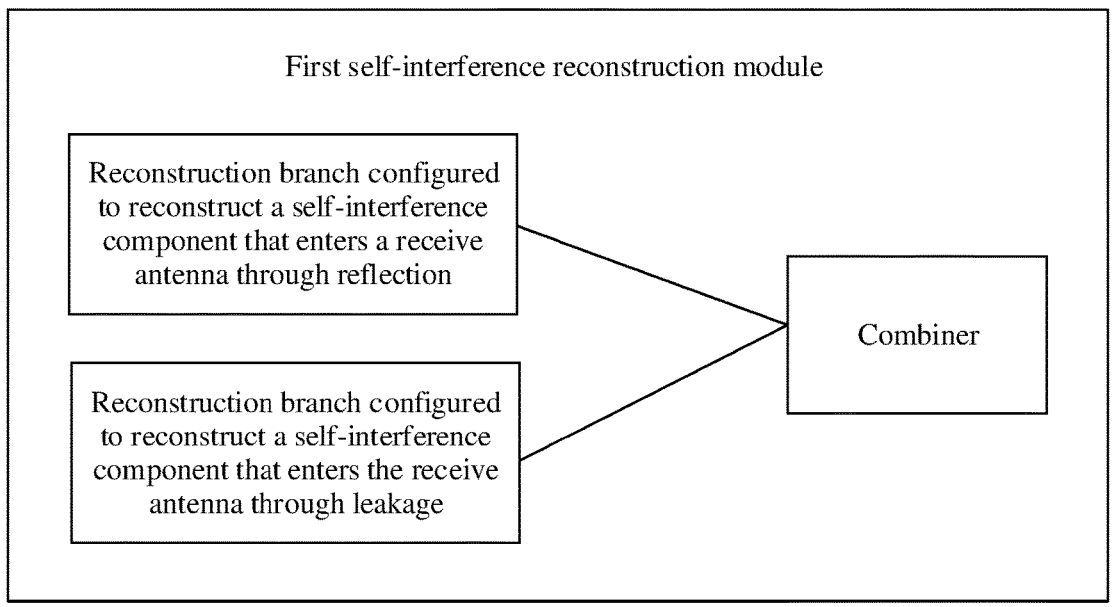
FIG. 9a is a schematic diagram of a structure of a first self-interference reconstruction module according to an embodiment of this application.

In some embodiments of this application, FIG. 9a is a schematic diagram of a structure of a first self-interference reconstruction module according to an embodiment of this application. When a transmit antenna and a receive antenna are not independent, the first self-interference reconstruction module includes: a reconstruction branch configured to reconstruct a self-interference component that enters the receive antenna through reflection, a reconstruction branch configured to reconstruct a self-interference component that enters the receive antenna through leakage, and a combiner configured to combine reconstruction signals of the two reconstruction branches.

A time reversal-filtered sending signal is divided into two signals by using a power divider, the two signals respectively pass through the reconstruction branch configured to reconstruct a self-interference component that enters the receive antenna through reflection and the reconstruction branch configured to reconstruct a self-interference component that enters the receive antenna through leakage, to obtain the two reconstruction signals, and the two reconstruction signals are combined by using the combiner.

That the transmit antenna and the receive antenna are not independent means that a same antenna is used for reception and transmission, that is, the transmit antenna and the receive antenna use a same antenna port. Two reconstruction branches may be disposed in the first self-interference reconstruction module, namely, the reconstruction branch configured to reconstruct a self-interference component that enters the receive antenna through reflection and the reconstruction branch configured to reconstruct a self-interference component that enters the receive antenna through leakage. The combiner is further disposed in the first self-interference reconstruction module, and the combiner is configured to combine the reconstruction signals of the two reconstruction branches.

For example, in this embodiment of this application, the first self-interference reconstruction module is mainly configured to reconstruct a self-interference signal propagated on a self-interference main path (with a strongest power). The self-interference signal propagated on the self-interference main path (with the strongest power) may include a sending signal reflected by the antenna port and a sending signal leaked from inside of a circulator (leaked from a transmit end to a received end) shown in FIG. 2. Therefore, two reconstruction branches may be disposed to respectively reconstruct the foregoing two signals. The first self-interference reconstruction module may set a delay of a transmit analog signal, coupled from a transmitter, to a fixed period of time, and perform amplitude modulation, and phase modulation on the transmit analog signal.

Figure 9B:
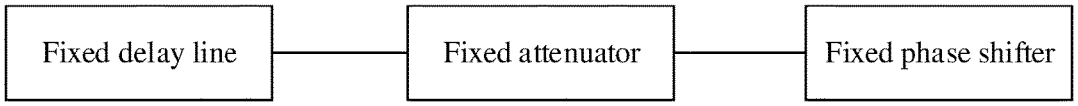
FIG. 9b is a schematic diagram of a structure of a reconstruction branch configured to reconstruct a self-interference component that enters a receive antenna through reflection according to an embodiment of this application.

Further, in some embodiments of this application, FIG. 9b is a schematic diagram of a structure of a reconstruction branch configured to reconstruct a self-interference component that enters a receive antenna through reflection according to an embodiment of this application. The reconstruction branch configured to reconstruct a self-interference component that enters the receive antenna through reflection includes a fixed delay line, a fixed attenuator, and a fixed phase shifter, two ends of the fixed attenuator are respectively connected to the fixed delay line and the fixed phase shifter, and a time reversal-filtered sending signal is fed into the fixed delay line and sequentially passes through the fixed attenuator and the fixed phase shifter, to obtain a reconstruction signal of the reconstruction branch. In this embodiment of this application, only one fixed delay line, one fixed attenuator, and one fixed phase shifter need to be disposed to obtain the reconstruction branch configured to reconstruct a self-interference component that enters the receive antenna through reflection. The reconstruction branch configured to reconstruct a self-interference component that enters the receive antenna through reflection has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

Figure 9C:
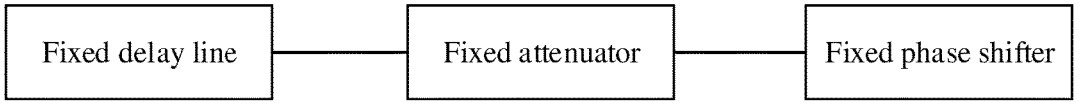
FIG. 9c is a schematic diagram of a structure of a reconstruction branch configured to reconstruct a self-interference component that enters a receive antenna through leakage according to an embodiment of this application.

Further, in some embodiments of this application, FIG. 9c is a schematic diagram of a structure of a reconstruction branch configured to reconstruct a self-interference component that enters a receive antenna through leakage according to an embodiment of this application. The reconstruction branch configured to reconstruct a self-interference component that enters the receive antenna through leakage includes a fixed delay line, a fixed attenuator, and a fixed phase shifter, two ends of the fixed attenuator are respectively connected to the fixed delay line and the fixed phase shifter, and a time reversal-filtered sending signal is fed into the fixed delay line and sequentially passes through the fixed attenuator and the fixed phase shifter, to obtain a reconstruction signal of the other reconstruction branch. In this embodiment of this application, only one fixed delay line, one fixed attenuator, and one fixed phase shifter need to be disposed to obtain the reconstruction branch configured to reconstruct a self-interference component that enters the receive antenna through leakage. The reconstruction branch configured to reconstruct a self-interference component that enters the receive antenna through leakage has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

Figure 9D:
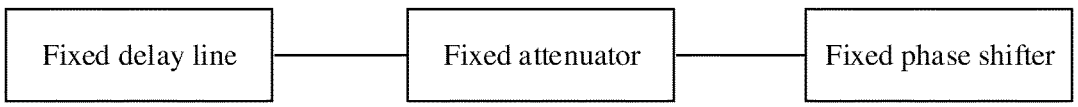
FIG. 9d is a schematic diagram of a structure of a first self-interference reconstruction module according to an embodiment of this application.

In some embodiments of this application, FIG. 9d is a schematic diagram of a structure of a first self-interference reconstruction module according to an embodiment of this application. When a transmit antenna and a receive antenna are independent, the first self-interference reconstruction module includes a fixed delay line, a fixed attenuator, and a fixed phase shifter, two ends of the fixed attenuator are respectively connected to the fixed delay line and the fixed phase shifter, and a time reversal-filtered sending signal is fed into the fixed delay line and sequentially passes through the fixed attenuator and the fixed phase shifter, to obtain a first-level self-interference reconstruction signal.

That the transmit antenna and the receive antenna are independent means that independent antennas are used for reception and transmission, that is, the transmit antenna and the receive antenna use independent antenna ports. In a wireless communications system in which independent antennas are used for reception and transmission, the self-interference signal is a transmit signal propagated on a direct line-of-sight path from the transmit antenna to the receive antenna. Direct line-of-sight propagation is propagation without being reflected by an obstacle, and a delay and a power of the self-interference signal are fixed. In this embodiment of this application, only one fixed delay line, one fixed attenuator, and one fixed phase shifter need to be disposed to obtain the second self-interference reconstruction module. The first self-interference reconstruction module has a single tap. The single tap including a fixed delay line, a fixed attenuator, and a fixed phase shifter may perform self-interference reconstruction. This reduces a quantity of taps of the first self-interference reconstruction module, reduces an area of the first self-interference reconstruction module, and is conducive to a miniaturization design of a device.

It can be learned from the foregoing example that in this embodiment of this application, the sending signal is time reversal-filtered and the time reversal-filtered sending signal is fed into the first self-interference reconstruction module, to obtain the first-level self-interference reconstruction signal; the sending signal is directly fed into the second self-interference reconstruction module, to obtain the second-level self-interference reconstruction signal; and finally, self-interference cancellation is performed, based on the first-level self-interference reconstruction signal and the second-level self-interference reconstruction signal, on the radio frequency signal received by the receive antenna. In this embodiment of this application, the sending signal is separately fed into two different self-interference reconstruction modules in different manners. The time reversal-filtered sending signal is fed into the first self-interference reconstruction module. Alternatively, the sending signal that is not time reversal-filtered may directly be fed into the second self-interference reconstruction module. The sending signal is time reversal-filtered, to obtain an impulse response to a self-interference channel. The impulse response to the self-interference channel is compressed into an impulse response to a channel with a single propagation path or several propagation paths. However, the second self-interference reconstruction module uses the sending signal that is not time reversal-filtered as a reference signal for self-interference reconstruction. Therefore, the second self-interference reconstruction module only needs to reconstruct a self-interference signal on a signal path or self-interference signals on several paths. This greatly reduces hardware implementation complexity and costs of the second self-interference reconstruction module, and improves a full-duplex self-interference cancellation capability.

The foregoing embodiment describes the full-duplex self-interference cancellation method in this embodiment of this application. The following describes a full-duplex self-interference cancellation apparatus according to an embodiment of this application. As shown in FIG. 3, the full-duplex self-interference cancellation apparatus includes:

a time reversal filter, configured to time reversal-filter a sending signal;

a first self-interference reconstruction module, configured to perform self-interference reconstruction on a time reversal-filtered sending signal, to obtain a first-level self-interference reconstruction signal;

a second self-interference reconstruction module, configured to directly perform self-interference reconstruction on the sending signal, to obtain a second-level self-interference reconstruction signal; and a combiner, configured to perform, based on the first-level self-interference reconstruction signal and the second-level self-interference reconstruction signal, self-interference cancellation on a radio frequency signal received by a receive antenna.

In some embodiments of this application, the second self-interference reconstruction module includes a fixed delay line, a variable attenuator, and a variable phase shifter, and two ends of the variable attenuator are respectively connected to the fixed delay line and the variable phase shifter.

In some embodiments of this application, the second self-interference reconstruction module includes a fixed delay line, a variable attenuator, and a fixed phase shifter, and two ends of the variable attenuator are respectively connected to the fixed delay line and the fixed phase shifter.

In some embodiments of this application, the time reversal filter time reversal-filters the sending signal in the following manner:

$$y(t)=x(t)\otimes(K\cdot h^*(-t)), \text{ where}$$

$y(t)$ indicates the time reversal-filtered sending signal, $x(t)$ indicates the sending signal, $h^*(-t)$ indicates time reversal filtering on $x(t)$, $h^*(-t)$ indicates a conjugate of $h(-t)$, $h(-t)$ indicates time reversal of $h(t)$, $h(t)$ indicates an impulse response to a residual self-interference channel obtained after the first-level self-interference reconstruction signal is canceled from the radio frequency signal received by the receive antenna, and K is a normalized coefficient.

In some embodiments of this application, when a transmit antenna and the receive antenna are not independent, the first self-interference reconstruction module includes: a reconstruction branch configured to reconstruct a self-interference component that enters the receive antenna through reflection, a reconstruction branch configured to reconstruct a self-interference component that enters the receive antenna through leakage, and a combiner configured to combine reconstruction signals of the two reconstruction branches.

In some embodiments of this application, the reconstruction branch configured to reconstruct a self-interference component that enters the receive antenna through reflection includes a fixed delay line, a fixed attenuator, and a fixed phase shifter, and two ends of the fixed attenuator are respectively connected to the fixed delay line and the fixed phase shifter.

In some embodiments of this application, the reconstruction branch configured to reconstruct a self-interference component that enters the receive antenna through leakage includes a fixed delay line, a fixed attenuator, and a fixed phase shifter, and two ends of the fixed attenuator are respectively connected to the fixed delay line and the fixed phase shifter.

In some embodiments of this application, when a transmit antenna and the receive antenna are independent, the first self-interference reconstruction module includes a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line.

To better understand and implement the foregoing full-duplex self-interference cancellation solution in this embodiment of this application, the following uses a corresponding application scenario as an example for description.

Figure 10A:
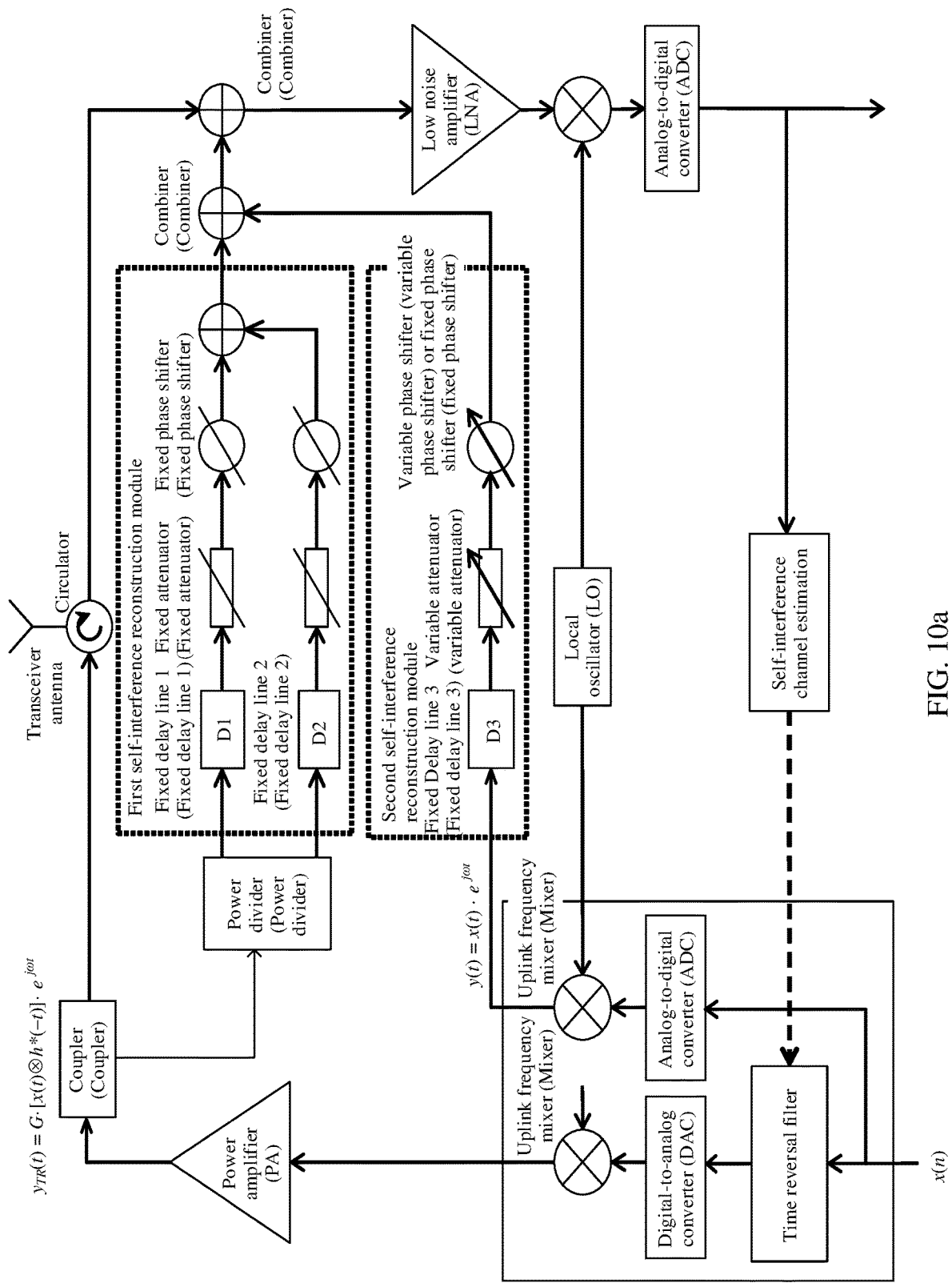
FIG. 10a is a schematic diagram of a principle of a self-interference cancellation method based on a case in which a same antenna is used for reception and transmission according to an embodiment of this application.

FIG. 10a is a schematic diagram of a self-interference cancellation method based on a case in which a same antenna is used for reception and transmission according to an embodiment of this application. A sent original baseband signal x(n) is time reversal-filtered (time reversal filter) in digital domain, and input to a transmit link. A finally transmitted radio frequency signal $\gamma_{TR}(t)=G\cdot[x(t)\otimes h^*(-t)]\cdot e^{j\omega t}$ is obtained after a time reversal-filtered signal is processed by using a digital-to-analog converter (DAC), an uplink frequency mixer, and a power amplifier (PA). A time reversal filter may perform self-interference channel estimation in a half-duplex timeslot, to obtain an impulse response to the time reversal filter.

G is an amplitude gain of the power amplifier, h(t) is an impulse response to a residual self-interference channel estimated on a digital baseband, h(t) is obtained through self-interference channel estimation, and $e^{j\omega t}$ indicates up-conversion. In this embodiment of this application, a coupler is further used to couple some transmit signals to a radio frequency interference cancellation module. In addition, in this embodiment of this application, the sent original baseband signal x(n) is further input to another transmit link, and a radio frequency signal $\gamma(t)=x(t)\cdot e^{j\omega t}$ is obtained through digital-to-analog conversion (DAC) and uplink frequency mixing, and is provided to the radio frequency interference cancellation module. The uplink frequency mixer may obtain a frequency source provided by a local oscillator (LO). A transmit signal $\gamma_{TR}(t)$ passes through the self-interference channel (as described above, including antenna port reflection, circulator coupling, near field multi-path reflection, and far field multi-path reflection) and enters a receiver. The receiver performs radio frequency self-interference cancellation on the received radio frequency signal and then input to an LNA. In this embodiment of this application, two self-interference reconstruction modules are used.

A first self-interference reconstruction module uses a transmit signal $\alpha\cdot\gamma_{TR}(t)$ directly coupled from a transmitter ($\alpha$ is an amplitude ratio of a signal output from a coupling end of the coupler to a signal at an input end) as a reference signal for self-interference reconstruction. As shown in FIG. 10a, after the reference signal $\alpha\cdot\gamma_{TR}(t)$ is divided into two signals by using a power divider, the two signals respectively pass through two self-interference reconstruction branches, to obtain two or more reconstructed self-interference components. Each self-interference reconstruction branch includes a fixed delay unit (which may also be referred to as a fixed delay line or a fixed delayer), a fixed attenuator, and a fixed phase shifter. Finally, a combiner is configured to combine the two reconstructed self-interference components, to obtain a first-level self-interference reconstruction signal.

Figure 10B:
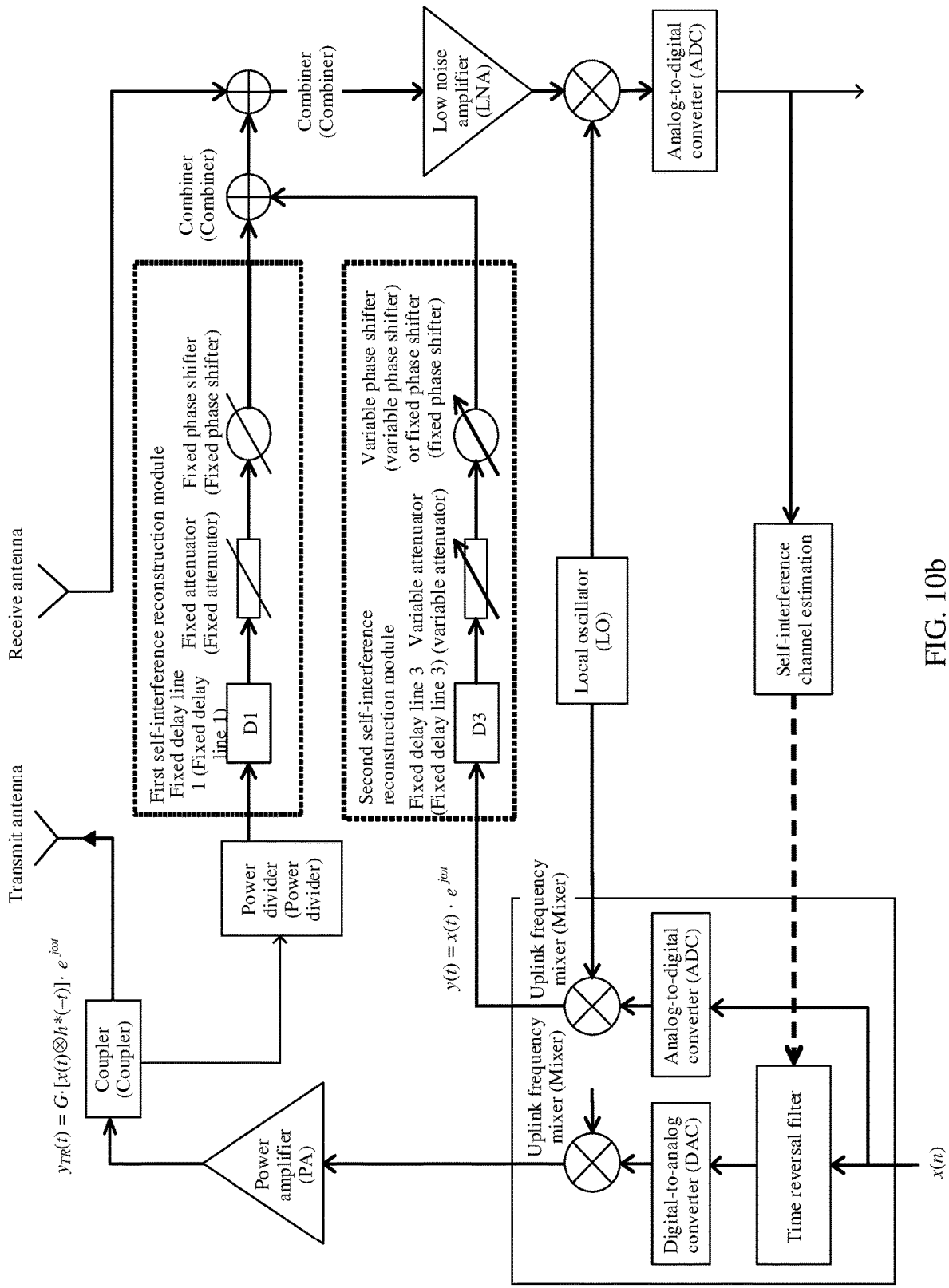
FIG. 10b is a schematic diagram of a principle of a self-interference cancellation method based on a case in which independent antennas are used for reception and transmission according to an embodiment of this application.

It should be noted that the solution shown in FIG. 10a is an embodiment of a wireless transceiver that a same antenna and circulator are used for reception and transmission. Therefore, the two reconstruction branches of the first self-interference reconstruction module are respectively for two self-interference components with strongest powers, that is, a self-interference component that enters the receiver through reflection by an antenna port and a self-interference component that enters the receiver through leakage from inside of the circulator shown in FIG. 2. For a wireless transceiver that independent antennas are used for reception and transmission, FIG. 10b is a schematic diagram of a principle of a self-interference cancellation method based on a case in which independent antennas are used for reception and transmission according to an embodiment of this application. A first self-interference reconstruction module in the solution of this embodiment of this application may only reconstruct one self-interference component with a strongest power, that is, a self-interference component that propagates on a direct line-of-sight path between a transmit antenna and a receive antenna. Therefore, when independent antennas are used for reception and transmission, the first self-interference reconstruction module includes one self-interference reconstruction branch.

A second self-interference reconstruction module uses a signal $\gamma(t)$ generated by a transmit link as a reference signal for self-interference reconstruction. Because a self-interference main path with a strongest power has been reconstructed at a first level, and an impulse response to a time reversal-filtered channel on a baseband is an estimated impulse response to a residual self-interference channel obtained after first-level radio frequency interference cancellation, a self-interference signal reconstructed at a second level may be understood as a self-interference component of a single compressed propagation path. Therefore, in this embodiment of this application, the second self-interference reconstruction module only needs one self-interference reconstruction branch, and the self-interference reconstruction branch may include a fixed delay unit, a variable attenuator, and a variable phase shifter. Because the reference signal $\gamma(t)$ is independently generated by the transmit link, and a reconstruction branch with a relatively large delay is implemented, a level-2 input signal x(n) may be delayed on a digital baseband, or a delay at a level of a digital sampling period is implemented by caching a sent original baseband signal x(n) in digital domain, and the fixed delay unit is used to perform more precise adjustment. In other words, caching may be performed on the digital baseband by inputting x(n), which is equivalent to delay.

Finally, in this embodiment of this application, a combiner combines a first-level self-interference reconstruction signal and a second-level self-interference reconstruction signal, and a combined signal directly cancels out a received radio frequency signal. Self-interference reconstruction signals of two levels are combined and cancel out the received frequency signal. A signal obtained through radio frequency interference cancellation may be processed by amplification by an LNA, downlink frequency mixing, analog-to-digital conversion (ADC), and digital interference cancellation.

It should be noted that, in FIG. 10a, self-interference reconstruction signals of two levels are combined (that is, added) and then cancel out the received radio frequency signal. In this embodiment of this application, the received radio frequency signal may further cancel out the first-level self-interference reconstruction signal, and then the received radio frequency signal may cancel out the second-level self-interference reconstruction signal. This is not limited.

Figure 11:
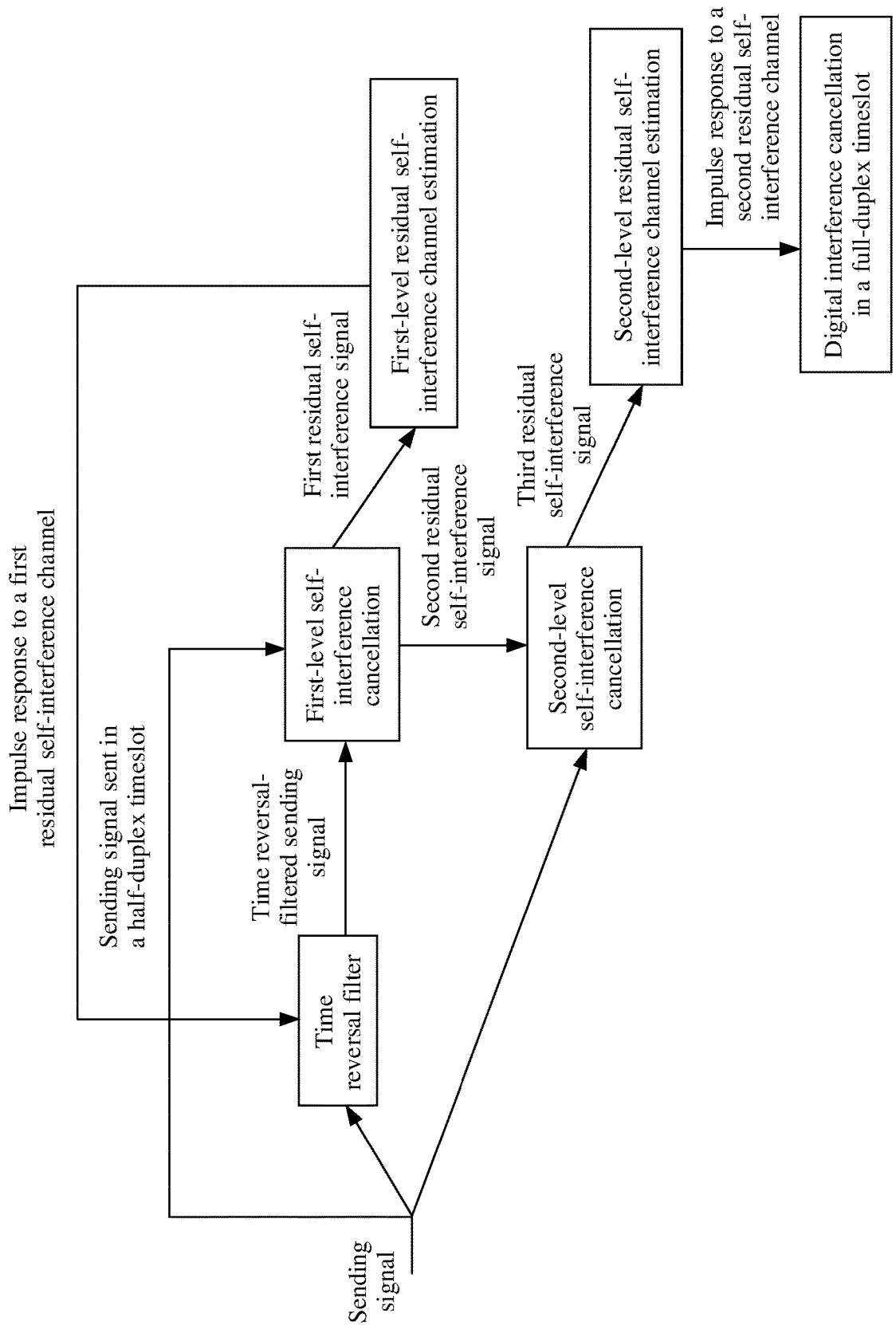
FIG. 11 is a schematic block flowchart of a full-duplex self-interference channel measurement method according to an embodiment of this application.

The following describes in detail a full-duplex self-interference channel measurement method according to an embodiment of this application. Refer to FIG. 11. The full-duplex self-interference channel measurement method includes:
performing first-level self-interference cancellation on a sending signal in a half-duplex timeslot, to obtain a first residual self-interference signal;
performing residual self-interference channel estimation based on the first residual self-interference signal, to obtain an impulse response to a first residual self-interference channel;
time reversal-filtering the sending signal based on the impulse response to the first residual self-interference channel;
performing first-level self-interference cancellation on a time reversal-filtered sending signal, to obtain a second residual self-interference signal;
performing second-level self-interference cancellation on the second residual self-interference signal, to obtain a third residual self-interference signal; and
performing residual self-interference channel estimation based on the third residual self-interference signal, to obtain an impulse response to a second residual self-interference channel, where the impulse response to the second residual self-interference channel is applied to digital interference cancellation in a full-duplex timeslot.

In this embodiment of this application, a frame structure in a wireless full-duplex communications system is divided into two types of timeslots: a half-duplex (HD) timeslot and a full-duplex (FD) timeslot. A wireless communications base station is used as an example. In the half-duplex timeslot, the base station only sends a downlink signal, and a receiver of the base station receives a self-interference signal for self-interference channel estimation. In the full-duplex timeslot, the base station sends a downlink signal and receives an uplink signal. The receiver of the base station reconstructs and cancels a self-interference component by using a self-interference channel estimated in the half-duplex timeslot, to receive the uplink signal. Based on a procedure of full-duplex self-interference channel measurement shown in FIG. 11, a self-interference channel may be estimated, to cancel a self-interference signal in the full-duplex timeslot, to obtain a desired signal of a far end.

Figure 12:
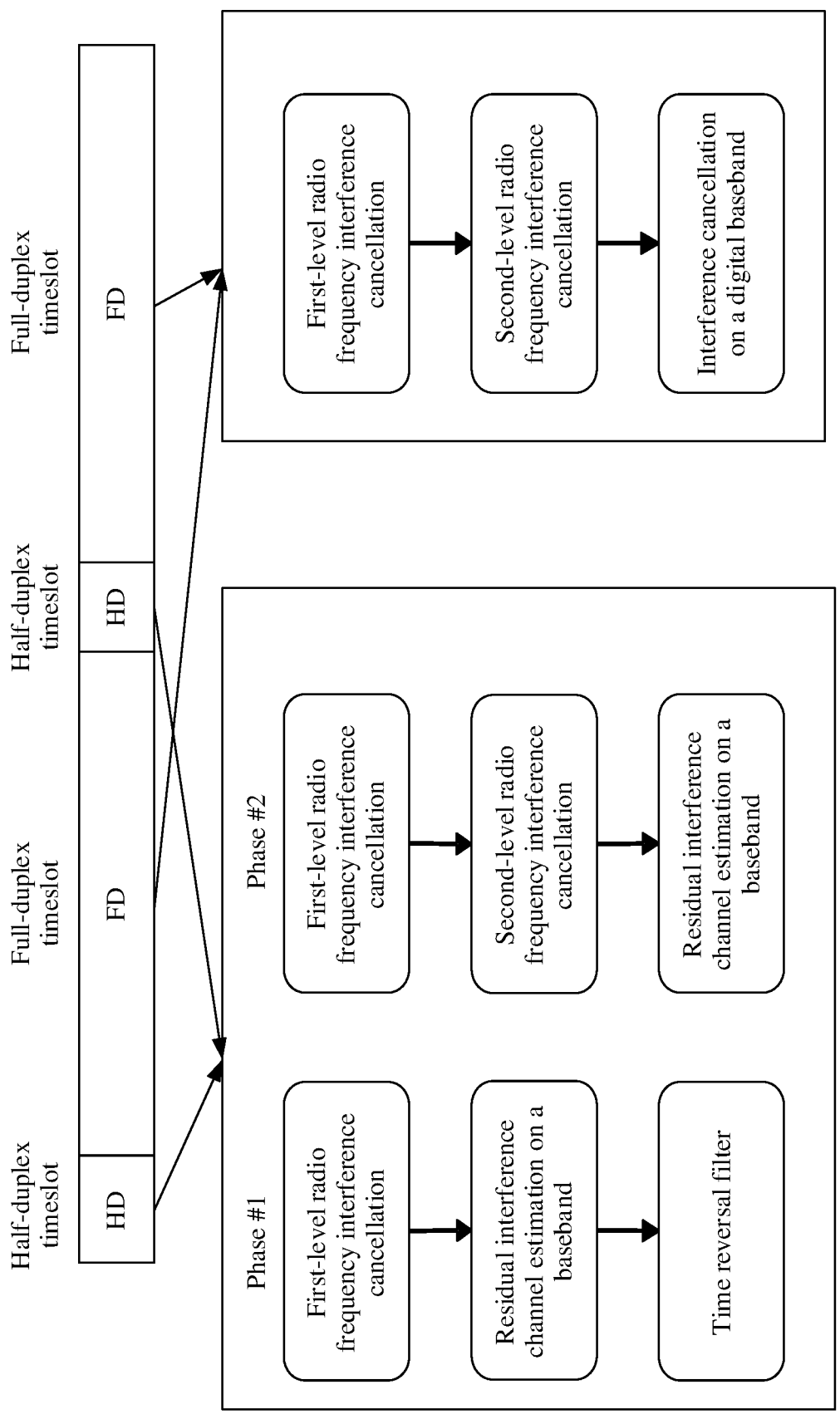
FIG. 12 is a schematic flowchart of self-interference channel measurement according to an embodiment of this application.

Based on the self-interference cancellation solution in this embodiment of this application, the half-duplex timeslot used for self-interference channel measurement is divided into two phases in this embodiment of this application. FIG. 12 is a schematic flowchart of self-interference channel measurement according to an embodiment of this application. In this embodiment of this application, in a phase #1 of the half-duplex timeslot, first-level radio frequency self-interference cancellation may first be performed in the half-duplex timeslot, to cancel a self-interference component with a strongest power; then, residual self-interference channel estimation is performed based on the residual self-interference signal on a digital baseband for the first time; and finally, a sent original baseband signal is time reversal-filtered based on the estimated impulse response to the first residual self-interference channel. In this embodiment of this application, in a phase #2 of the half-duplex timeslot, the self-interference cancellation of the two levels is performed on the time reversal-filtered sending signal, and residual self-interference channel estimation is performed based on the residual self-interference signal on the digital baseband for the second time, where the residual self-interference channel estimation for the second time is used by the following digital baseband interference cancellation module in a full-duplex timeslot. In the full-duplex timeslot, based on the foregoing basic solution, in this embodiment of this application, first-level radio frequency interference cancellation, second-level radio frequency interference cancellation, and digital baseband interference cancellation are sequentially performed on the received radio frequency signal, to finally obtain a desired signal sent by a communication peer end.

Figure 13:
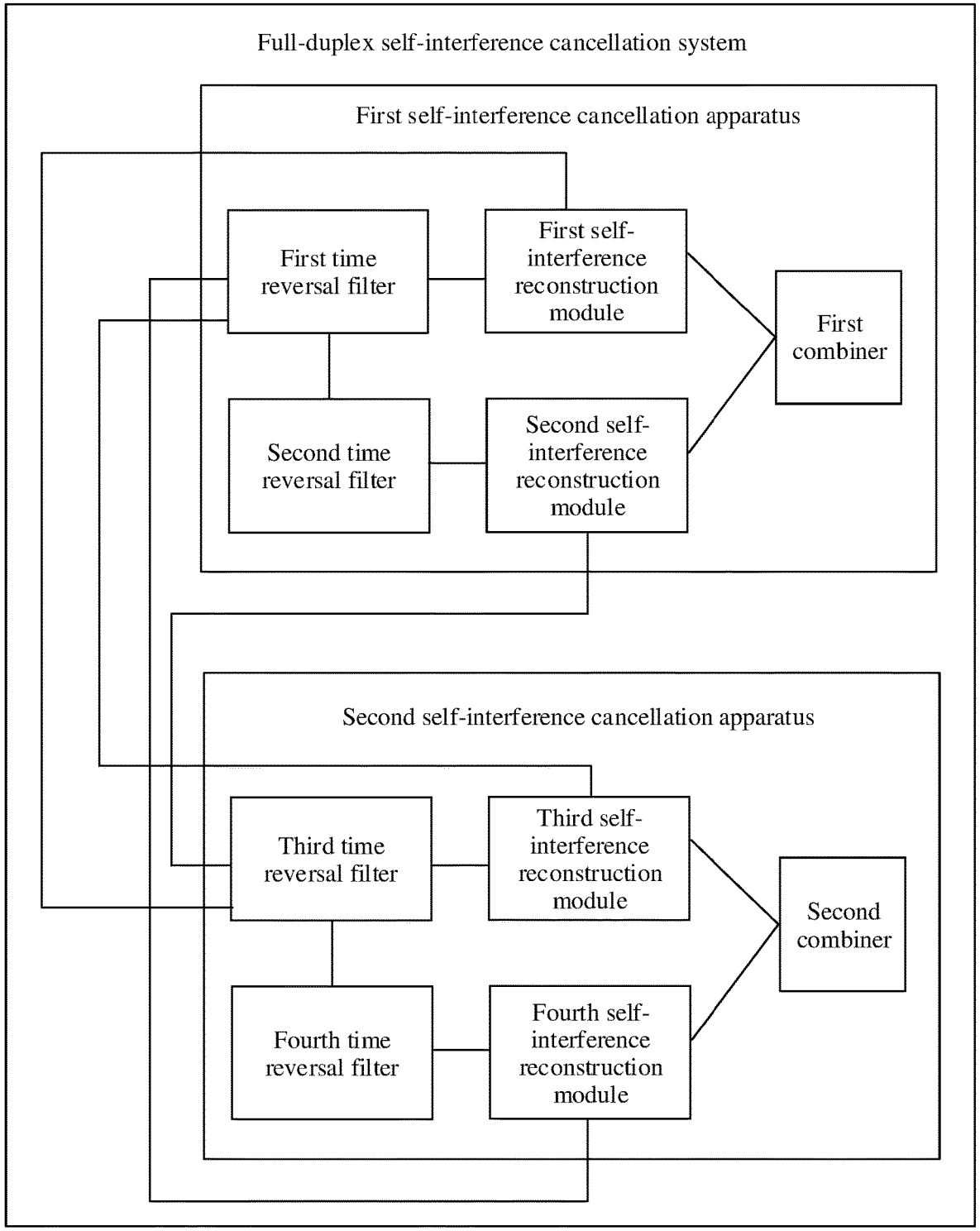
FIG. 13 is a schematic diagram of a structure of a full-duplex self-interference cancellation system according to an embodiment of this application.

FIG. 13 is a full-duplex self-interference cancellation system according to an embodiment of this application. The full-duplex self-interference cancellation system includes a first self-interference cancellation apparatus and a second self-interference cancellation apparatus.

The first self-interference cancellation apparatus includes a first time reversal filter, a second time reversal filter, a first self-interference reconstruction module, a second self-interference reconstruction module, and a first combiner.

The second self-interference cancellation apparatus includes a third time reversal filter, a fourth time reversal filter, a third self-interference reconstruction module, a fourth self-interference reconstruction module, and a second combiner.

The second time reversal filter is configured to time reversal-filter a first sending signal.

The first time reversal filter is configured to time reversal-filter a time reversal-filtered first sending signal output by the second time reversal filter.

The fourth time reversal filter is configured to time reversal-filter a second sending signal.

The third time reversal filter is configured to time reversal-filter a time reversal-filtered second sending signal output by the fourth time reversal filter.

The first self-interference reconstruction module is configured to perform self-interference reconstruction on a first sending signal time reversal-filtered by the first time reversal filter and the second time reversal filter and on a second sending signal time reversal-filtered by the third time reversal filter and the fourth time reversal filter, to obtain a first-level self-interference reconstruction signal.

The second self-interference reconstruction module is configured to perform self-interference reconstruction on the first sending signal time reversal-filtered by the second time reversal filter and on the second sending signal time reversal-filtered by the fourth time reversal filter, to obtain a second-level self-interference reconstruction signal.

The first combiner is configured to perform, based on the first-level self-interference reconstruction signal and the second-level self-interference reconstruction signal, self-interference cancellation on a radio frequency signal received by a first receive antenna.

The third self-interference reconstruction module is configured to perform self-interference reconstruction on the first sending signal time reversal-filtered by the first time reversal filter and the second time reversal filter and on the second sending signal time reversal-filtered by the third time reversal filter and the fourth time reversal filter, to obtain a third-level self-interference reconstruction signal.

The fourth self-interference reconstruction module is configured to perform self-interference reconstruction on the first sending signal time reversal-filtered by the first time reversal filter and on the second sending signal time reversal-filtered by the fourth time reversal filter, to obtain a fourth-level self-interference reconstruction signal.

The second combiner is configured to perform, based on the third-level self-interference reconstruction signal and the fourth-level self-interference reconstruction signal, self-interference cancellation on a radio frequency signal received by a second receive antenna.

The first time reversal filter in the first self-interference cancellation apparatus needs to be connected to the first self-interference reconstruction module, the second time reversal filter, and the third self-interference reconstruction module and the fourth self-interference reconstruction module in the second self-interference cancellation apparatus. For execution functions of modules in the first self-interference cancellation apparatus and the second self-interference cancellation apparatus, refer to description in the foregoing content.

Figure 14:
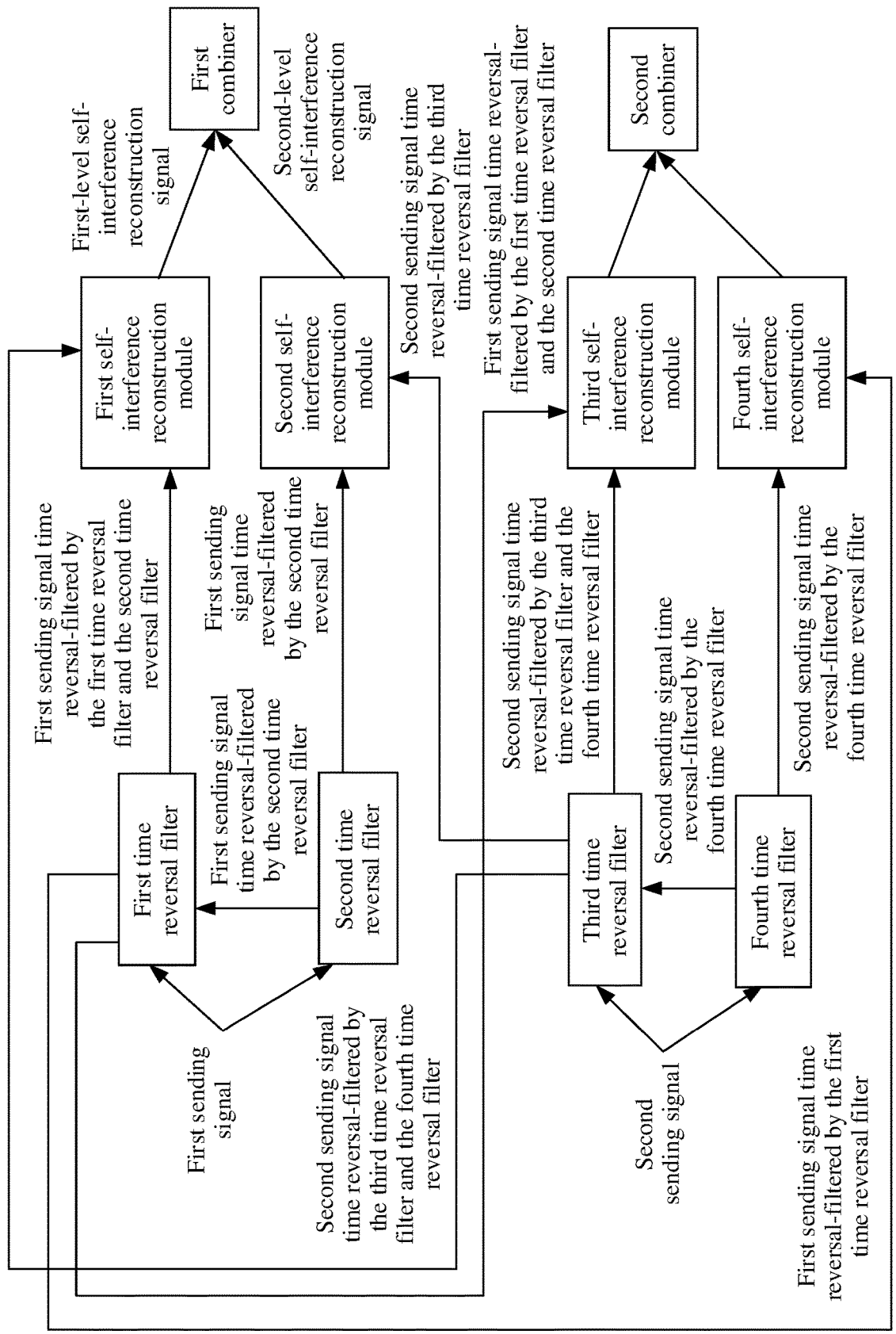
FIG. 14 is a schematic block flowchart of a full-duplex self-interference cancellation method according to an embodiment of this application.

Referring to FIG. 14, an embodiment of this application further provides a full-duplex self-interference cancellation method. The method is used by a full-duplex self-interference cancellation system, and the full-duplex self-interference cancellation system includes a first self-interference cancellation apparatus and a second self-interference cancellation apparatus.

The first self-interference cancellation apparatus includes a first time reversal filter, a second time reversal filter, a first self-interference reconstruction module, a second self-interference reconstruction module, and a first combiner.

The second self-interference cancellation apparatus includes a third time reversal filter, a fourth time reversal filter, a third self-interference reconstruction module, a fourth self-interference reconstruction module, and a second combiner.

Based on the full-duplex self-interference cancellation system, the full-duplex self-interference cancellation method provided in this embodiment of this application includes:

the first time reversal filter and the second time reversal filter time reversal-filter a first sending signal, and then a time reversal-filtered first sending signal is fed into the first self-interference reconstruction module, and the third time reversal filter and the fourth time reversal filter time reversal-filter a second sending signal, and then a time reversal-filtered second sending signal is fed into the first self-interference reconstruction module, to obtain a first-level self-interference reconstruction signal;

the second time reversal filter time reversal-filters the first sending signal, and a time reversal-filtered first sending signal is directly fed into the second self-interference reconstruction module, and the third time reversal filter time reversal-filters the second sending signal, and a time reversal-filtered second sending signal is directly fed into the second self-interference reconstruction module, to obtain a second-level self-interference reconstruction signal;

the first-level self-interference reconstruction signal and the second-level self-interference reconstruction signal are input to the first combiner, and the first combiner performs self-interference cancellation on a radio frequency signal received by a first receive antenna;

the first time reversal filter and the second time reversal filter time reversal-filter the first sending signal, and then the time reversal-filtered first sending signal is fed into the third self-interference reconstruction module, and the third time reversal filter and the fourth time reversal filter time reversal-filter the second sending signal, and then the time reversal-filtered second sending signal is fed into the third self-interference reconstruction module, to obtain a third-level self-interference reconstruction signal;

the first time reversal filter time reversal-filters the first sending signal, and a time reversal-filtered first sending signal is directly fed into the fourth self-interference reconstruction module, and the fourth time reversal filter time reversal-filters the second sending signal, and a time reversal-filtered second sending signal is directly fed into the fourth self-interference reconstruction module, to obtain a fourth-level self-interference reconstruction signal; and the third-level self-interference reconstruction signal and the fourth-level self-interference reconstruction signal are input to the second combiner, and the second combiner performs self-interference cancellation on a radio frequency signal received by a second receive antenna.

That the second time reversal filter time reversal-filters the first sending signal in FIG. 14 means that the first sending signal is processed only by the second time reversal filter and is not processed by the first time reversal filter. That the first time reversal filter and the second time reversal filter time reversal-filter the first sending signal means that the first sending signal is first processed by the second time reversal filter and then processed by the first time reversal filter. Similarly, that the fourth time reversal filter time reversal-filters the second sending signal in FIG. 14 means that the second sending signal is processed only by the fourth time reversal filter and is not processed by the third time reversal filter. That the third time reversal filter and the fourth time reversal filter time reversal-filter the second sending signal means that the first sending signal is first processed by the fourth time reversal filter and then processed by the third time reversal filter.

Figure 15A:
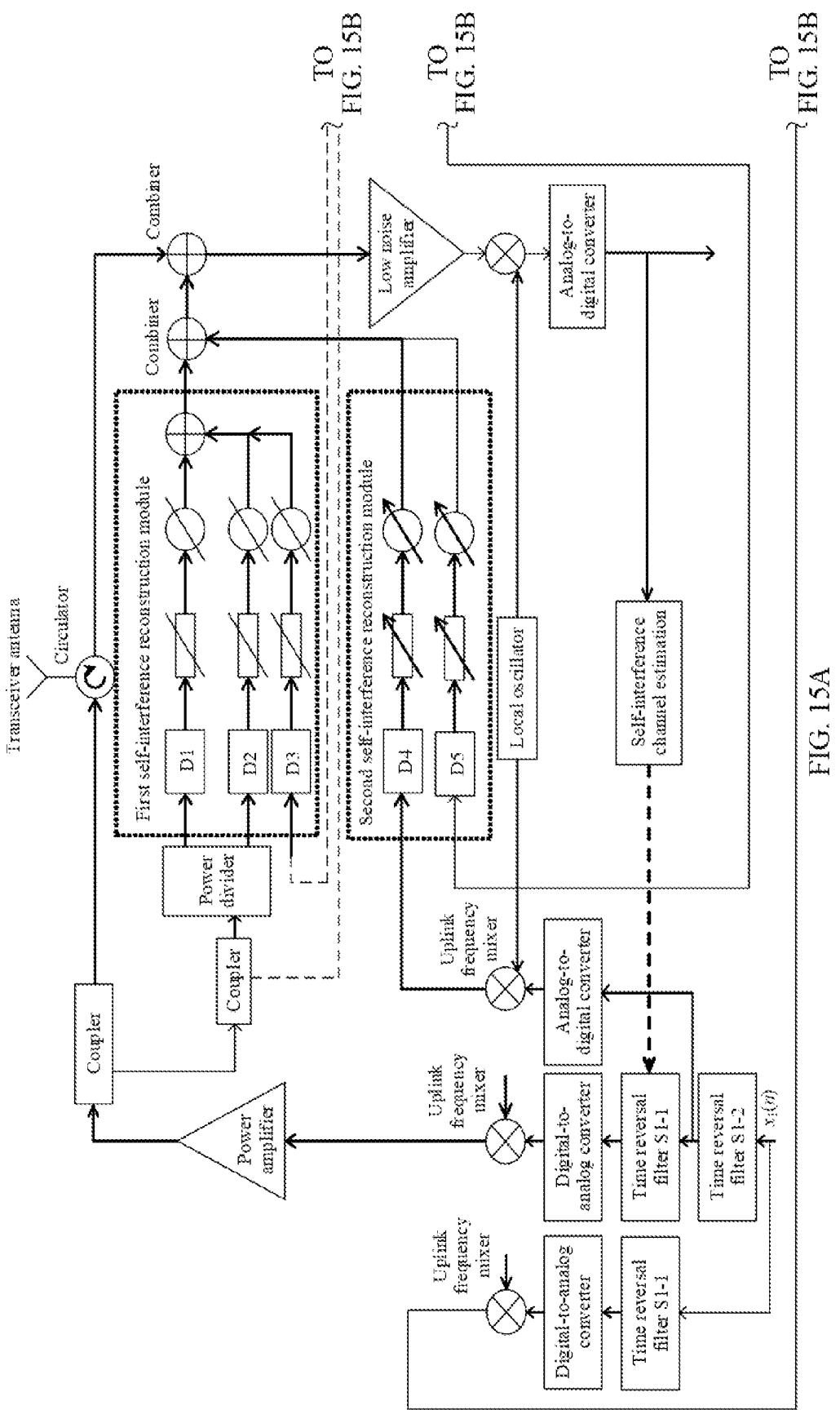
FIG. 15A and FIG. 15B are a schematic diagram of a principle of a self-interference cancellation solution in a MIMO scenario according to an embodiment of this application.
Figure 15B:
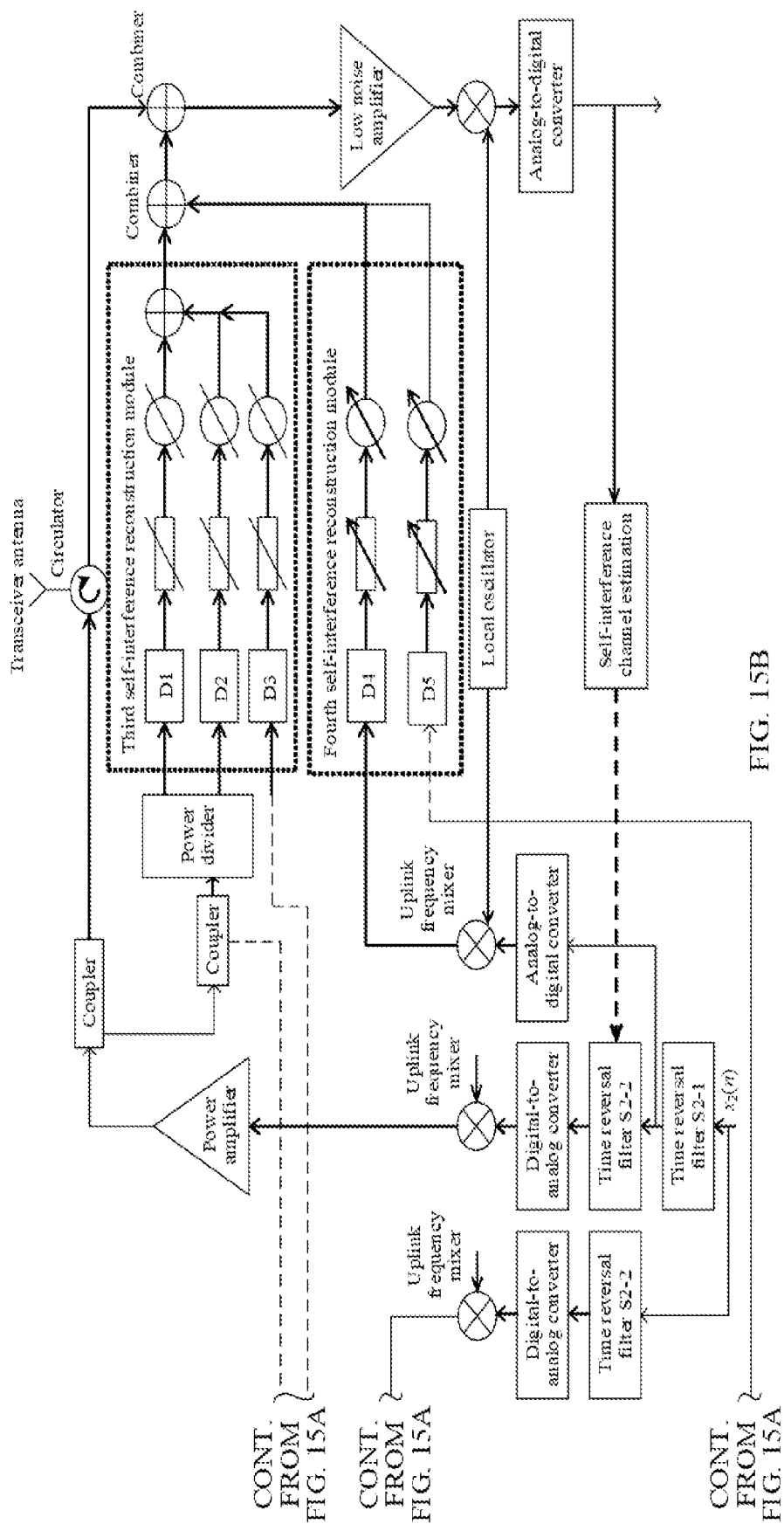

FIG. 15A and FIG. 15B are a schematic diagram of a principle of a self-interference cancellation solution in a multi-input multi-output (MIMO) scenario according to an embodiment of this application. A time reversal filter S1-1 in FIG. 15A and FIG. 15B corresponds to the first time reversal filter, a time reversal filter S1-2 corresponds to the second time reversal filter, a time reversal filter S2-2 corresponds to the third time reversal filter, and a time reversal filter S2-1 corresponds to the fourth time reversal filter.

The full-duplex self-interference cancellation method in this embodiment of this application may further be applied to the MIMO scenario. In FIG. 15A and FIG. 15B, a wireless full-duplex transceiver with two transmit antennas and two receive antennas is used as an example. In this embodiment of this application, self-interference signals sent by the two local transmit antennas need to be reconstructed and canceled on each receive link. Therefore, compared with the basic solution shown in FIG. 10a, the full-duplex self-interference cancellation method in this embodiment of this application may further include:

a radio frequency signal sent by each transmit antenna is obtained after a sent original baseband signal is time reversal-filtered for two times in digital domain, where two times of time reversal filtering respectively correspond to self-interference channels between the transmit antenna and the receive antennas; and a reconstruction branch is added to a first self-interference reconstruction module of each receiver, and is configured to reconstruct a self-interference component with a strongest power from another transmit antenna, that is, the self-interference component propagated on a direct line-of-sight between the another transmit antenna and the receive antenna, where a used reference signal is a transmit signal coupled from another transmitter. As shown in FIG. 15A and FIG. 15B, in this embodiment of this application, a coupler may be added, and is configured to couple a reference signal that is coupled by a coupler between a PA on another transmit link and the transmit antenna.

A reconstruction branch is added to a second self-interference reconstruction module of each receiver, and is configured to reconstruct a time reversal-filtered self-interference component from another transmit antenna, where a used reference signal is a radio frequency signal obtained after another sent original baseband signal is time reversal-filtered, and time reversal filtering corresponds to a self-interference channel between another transmit antenna and another receive antenna.

The reference signal that is used by the branch that is configured to reconstruct a self-interference component between the transmit antenna and the receive antenna and that is in the second self-interference reconstruction module of each receiver is a radio frequency signal obtained after the original baseband signal sent by the module is time reversal-filtered, where time reversal filtering corresponds to a self-interference channel between the transmit antenna and another receive antenna.

It should be noted that, in the foregoing embodiment of this application, the full-duplex self-interference cancellation system includes the first self-interference cancellation apparatus and the second self-interference cancellation apparatus. Each self-interference cancellation apparatus needs to cancel both a sending signal from the antenna and a sending signal from another antenna. For example, it can be learned from comparison between FIG. 15A and FIG. 15B and FIG. 10a that, the first self-interference reconstruction module is used as an example, a tap on which D1 is located and a tap on which D2 is located are used to cancel sending signals from the antenna, and a tap on which D3 is located is used to cancel a sending signal from another antenna. In the MIMO scenario, when a quantity of antennas is large, taps for the antennas need to be added to each self-interference cancellation apparatus, to cancel a sending signal from another antenna.

It can be learned from the foregoing examples that, in this embodiment of this application, the original sending signal is time reversal-filtered based on the residual self-interference channel obtained after first-level radio frequency interference cancellation. In this embodiment of this application, the two self-interference reconstruction modules use different reference signals, that is, the time reversal-filtered original sending signal and the original sending signal that is not time reversal-filtered. In this embodiment of this application, the procedure of self-interference channel measurement with two phases is used. This reduces hardware implementation complexity and costs of radio frequency interference cancellation, improves radio frequency interference cancellation performance, and improves overall performance of full-duplex self-interference cancellation.

The full-duplex self-interference cancellation apparatus in this embodiment of this application may be specifically a chip. The chip includes a processing unit and a communications unit. The processing unit may be, for example, a processor, and the communications unit may be, for example, an input/output interface, a pin, or a circuit. The processing unit may execute computer executable instructions stored in a storage unit, so that a chip in a terminal performs the full-duplex self-interference cancellation method in any one of the first aspect. Optionally, the storage unit is a storage unit in the chip, such as a register or a buffer; or the storage unit may be a storage unit in the terminal but outside the chip, such as a read-only memory (ROM), another type of static storage device capable of storing static information and an instruction, or a random access memory (RAM).

The processor mentioned above may be a general-purpose central processing unit, a microprocessor, an ASIC, or one or more integrated circuits for controlling program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, all functions completed by a computer program may be easily implemented by using corresponding hardware, and a specific hardware structure used to implement a same function may also be of various forms, for example, a form of an analog circuit, a digital circuit, or a dedicated circuit. However, in this application, a software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A non-transitory computer-readable storage medium storing instructions that, when the instructions are run on a computer, cause the computer to perform the following operations:

time reversal-filtering a sending signal and feeding a time reversal-filtered sending signal into a first self-interference reconstruction module, to obtain a first-level self-interference reconstruction signal;

directly feeding the sending signal into a second self-interference reconstruction module, to obtain a second-level self-interference reconstruction signal; and performing, based on the first-level self-interference reconstruction signal and the second-level self-interference reconstruction signal, self-interference cancellation on a radio frequency signal received by a receive antenna, wherein the second self-interference reconstruction module comprises a fixed delay line, a variable attenuator, and a phase shifter, two ends of the variable attenuator are respectively connected to the fixed delay line and the phase shifter, and the sending signal is directly fed into the fixed delay line and sequentially passes through the variable attenuator and the phase shifter, to obtain the second-level self-interference reconstruction signal.

2. The non-transitory computer-readable storage medium according to claim 1, wherein the phase shifter is a variable phase shifter.

3. The non-transitory computer-readable storage medium according to claim 1, wherein the phase shifter is a fixed phase shifter.

4. The non-transitory computer-readable storage medium according to claim 1, wherein the sending signal is time reversal-filtered in the following manner:

$y(t)=x(t)\otimes(K\cdot h^*(-t))$, wherein y(t) indicates the time reversal-filtered sending signal, x(t) indicates the sending signal, h*(−t) indicates time reversal filtering on x(t), h*(−t) indicates a conjugate of h(−t), h(−t) indicates time reversal of h(t), h(t) indicates an impulse response to a residual self-interference channel obtained after the first-level self-interference reconstruction signal is canceled from the radio frequency signal received by the receive antenna, and K is a normalized coefficient.

5. The non-transitory computer-readable storage medium according to claim 1, wherein a transmit antenna and the receive antenna are not independent, the first self-interference reconstruction module comprises: a first reconstruction branch configured to reconstruct a self-interference component that enters the receive antenna through reflection, a second reconstruction branch configured to reconstruct a self-interference component that enters the receive antenna through leakage, and a combiner configured to combine reconstruction signals of the first and second reconstruction branches; and the time reversal-filtered sending signal is divided into two signals using a power divider, the two signals respectively pass through the first reconstruction branch and the second reconstruction branch to obtain the first-level self-interference reconstruction signals and the second-level self-interference reconstruction signal, and the first-level self-interference reconstruction signal and the second-level self-interference reconstruction signal are combined using the combiner.

6. The non-transitory computer-readable storage medium according to claim 5, wherein the first reconstruction branch comprises a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the reconstruction signal of the first reconstruction branch.

7. The non-transitory computer-readable storage medium according to claim 5, wherein the second reconstruction branch comprises a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the reconstruction signal of the second reconstruction branch.

8. The non-transitory computer-readable storage medium according to claim 1, wherein a transmit antenna and the receive antenna are independent, the first self-interference reconstruction module comprises a fixed delay line, a fixed attenuator, and a fixed phase shifter, two ends of the fixed attenuator are respectively connected to the fixed delay line and the fixed phase shifter, and the time reversal-filtered sending signal is fed into the fixed delay line and sequentially passes through the fixed attenuator and the fixed phase shifter, to obtain the first-level self-interference reconstruction signal.

9. A non-transitory computer-readable storage medium storing instructions that, when the instructions are run on a computer, cause the computer to perform the following operations:

performing first-level self-interference cancellation on a sending signal in a half-duplex timeslot, to obtain a first residual self-interference signal;

performing residual self-interference channel estimation based on the first residual self-interference signal, to obtain an impulse response to a first residual self-interference channel;

time reversal-filtering the sending signal based on the impulse response to the first residual self-interference channel;

performing first-level self-interference cancellation on a time reversal-filtered sending signal, to obtain a second residual self-interference signal;

performing second-level self-interference cancellation on the second residual self-interference signal, to obtain a third residual self-interference signal; and performing residual self-interference channel estimation based on the third residual self-interference signal, to obtain an impulse response to a second residual self-interference channel, wherein the impulse response to the second residual self-interference channel is applied to digital interference cancellation in a full-duplex timeslot.

10. A full-duplex self-interference cancellation system, wherein the full-duplex self-interference cancellation system comprises:
   a first self-interference cancellation apparatus including a first time reversal filter, a second time reversal filter, a first self-interference reconstruction module, a second self-interference reconstruction module, and a first combiner; and
   a second self-interference cancellation apparatus including a third time reversal filter, a fourth time reversal filter, a third self-interference reconstruction module, a fourth self-interference reconstruction module, and a second combiner.

11. The full-duplex self-interference cancellation system according to claim 10, wherein the second time reversal filter is configured to time reversal-filter a first sending signal, the first time reversal filter is configured to time reversal-filter a time reversal-filtered first sending signal output by the second time reversal filter; the fourth time reversal filter is configured to time reversal-filter a second sending signal; the third time reversal filter is configured to time reversal-filter a time reversal-filtered second sending signal output by the fourth time reversal filter.

* * * * *